United States Patent
Kawamura et al.

(10) Patent No.: US 10,500,970 B2
(45) Date of Patent: Dec. 10, 2019

(54) POWER SUPPLY APPARATUS, TRANSPORT DEVICE INCLUDING POWER SUPPLY APPARATUS, ESTIMATING METHOD OF ESTIMATING CORRELATION INFORMATION BETWEEN CHARGE RATE AND OPEN-END VOLTAGE OF ELECTRIC STORAGE SECTION, AND COMPUTER READABLE MEDIUM FOR ESTIMATING CORRELATION INFORMATION

(71) Applicant: HONDA MOTOR CO., LTD., Tokyo (JP)

(72) Inventors: Masayuki Kawamura, Saitama (JP); Hajime Fujita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 110 days.

(21) Appl. No.: 15/470,932

(22) Filed: Mar. 28, 2017

(65) Prior Publication Data
US 2017/0282745 A1 Oct. 5, 2017

(30) Foreign Application Priority Data
Mar. 30, 2016 (JP) .................. 2016-069758

(51) Int. Cl.
*G01R 31/36* (2019.01)
*H02J 7/00* (2006.01)
(Continued)

(52) U.S. Cl.
CPC ........ *B60L 11/1862* (2013.01); *H01M 10/48* (2013.01); *H02J 7/0021* (2013.01);
(Continued)

(58) Field of Classification Search
CPC .............. B60L 11/1861; B60L 11/1862; B60L 2240/549; B60L 2240/547; Y02T 10/7005; Y02T 10/7044; Y02T 10/705
See application file for complete search history.

(56) References Cited

U.S. PATENT DOCUMENTS 8,498,766 B2 * 7/2013 Takahashi ............... B60L 1/003
701/22
8,648,571 B2 * 2/2014 Oki ..................... B60L 11/1809
320/104
(Continued)

*Primary Examiner* — David V Henze-Gongola
*Assistant Examiner* — Tarikh Kanem Rankine

(57) ABSTRACT

A power supply apparatus includes a first and second electric storage sections, a charge/discharge circuit performing charge/discharge between the first and second storage sections, and a control section controlling the charge/discharge circuit. The control section sets at least one of the first and second storage sections as a target storage section, acquires a target SOC and a target OCV which are respectively a charge rate and an open-end voltage of the target storage section, collects, by using charge transfer between the first and second storage sections, data including the target SOC and the target OCV in an order based on a collection rule determined by collected data and the target SOC, the collected data being an aggregation of the data which is collected, and estimates correlation information between an SOC and an OCV of the target storage section based on a plurality of the data.

19 Claims, 13 Drawing Sheets

(51) Int. Cl.
  H01M 10/48  (2006.01)
  B60L 11/18  (2006.01)
  B60L 53/00  (2019.01)
  H01M 10/44  (2006.01)
  H01M 10/42  (2006.01)

(52) U.S. Cl.
  CPC .............. *B60L 53/00* (2019.02); *H01M 10/44* (2013.01); *H01M 2010/4271* (2013.01)

(56) References Cited

U.S. PATENT DOCUMENTS

| | | | |
|---|---|---|---|
| 8,975,897 B2* | 3/2015 | Yoshioka | G01R 31/3651 |
| | | | 320/132 |
| 9,085,238 B2* | 7/2015 | Sisk | B60L 1/00 |
| 9,658,291 B1* | 5/2017 | Wang | G01R 31/3624 |
| 9,983,270 B2* | 5/2018 | Sejima | G01R 31/3624 |
| 2009/0051321 A1* | 2/2009 | Sato | B60L 58/12 |
| | | | 320/132 |
| 2010/0045239 A1 | 2/2010 | Oki | |
| 2012/0091930 A1* | 4/2012 | Takahashi | B60L 11/1861 |
| | | | 318/139 |

* cited by examiner

COMBINATION OF NUMBER OF
COLLECTED DATA FOR EACH SOC

| PRESENT SOC | $(N_0, N_{10}, \cdots)$ $=(0,0,\cdots)$ | $(N_0, N_{10}, \cdots)$ $=(1,0,\cdots)$ | · · · |
|---|---|---|---|
| 0 | NEXT $SOC_{1,1}$ | NEXT $SOC_{1,2}$ | · · · |
| 10 | NEXT $SOC_{2,1}$ | NEXT $SOC_{2,2}$ | · · · |
| ⋮ | ⋮ | ⋮ | ⋱ |

1300

COMBINATION OF NUMBER
OF COLLECTED DATA FOR
EACH SOC AND PRESENT SOC

NEXT ACQUISITION
TARGET SOC

POWER SUPPLY APPARATUS, TRANSPORT DEVICE INCLUDING POWER SUPPLY APPARATUS, ESTIMATING METHOD OF ESTIMATING CORRELATION INFORMATION BETWEEN CHARGE RATE AND OPEN-END VOLTAGE OF ELECTRIC STORAGE SECTION, AND COMPUTER READABLE MEDIUM FOR ESTIMATING CORRELATION INFORMATION

The contents of the following Japanese patent application(s) are incorporated herein by reference:
NO. 2016-069758 filed on Mar. 30, 2016.

BACKGROUND

1. Technical Field

The present invention relates to a power supply apparatus, a transport device including the power supply apparatus, an estimating method of estimating correlation information between a charge rate and an open-end voltage of an electric storage section, and a computer readable medium for estimating the correlation information.

2. Related Art

In a system including a plurality of storage batteries, a technique has been known for grasping a relation of an SOC (State Of Charge, a charge rate) to an OCV (Open Circuit Voltage, an open-end voltage) by performing charge/discharge between the storage batteries.

PRIOR ART DOCUMENT

Patent Document

[Patent Document 1] Japanese Patent Application Publication No. 2008-220080

SUMMARY

There has been a problem that correlation information between an SOC and an OCV of an electric storage section cannot be efficiently estimated.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
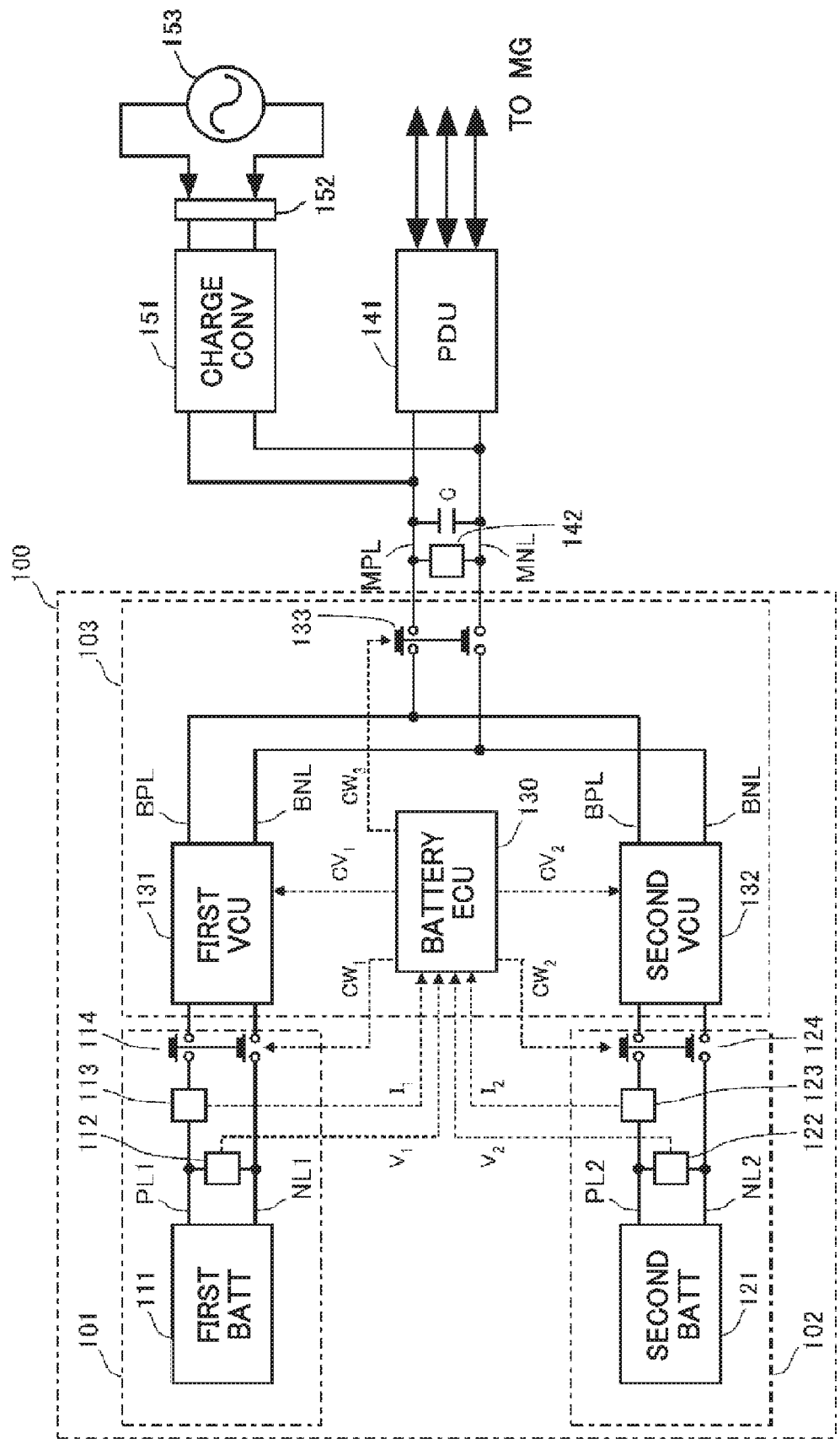
FIG. 1 shows a block diagram of a transport device according to the present embodiment.

FIG. 1 is a block diagram of a transport device 10 according to the present embodiment. The transport device according to the present embodiment is, for example, an electric vehicle. In the followings, a power storage device 100 according to the present embodiment will be described assuming a case of being utilized mounted on an electric vehicle. The power storage device 100 is one example of the power supply apparatus.

The transport device 10 runs by rotationally driving a motor generator MG by a PDU 141, the PDU 141 being a power drive unit and receiving a driving power supplied from the mounted power storage device 100.

The PDU 141 is connected to the power storage device 100 through a main positive busbar MPL and a main negative busbar MNL. A smoothing condenser C is connected between the main positive busbar MPL and the main negative busbar MNL, reducing a high frequency component of a conducting power. A third voltage sensor 142 detects a voltage Vh between the main positive busbar MPL and the main negative busbar MNL, and the detected voltage Vh is utilized for controlling the PDU 141.

The PDU 141 converts a driving power (DC power) supplied from the main positive busbar MPL and the main negative busbar MNL into AC power and outputs it to a motor generator MG. The motor generator MG includes, for example, a three-phase AC rotary electric machine. The motor generator MG rotates wheels via a motive power transmission mechanism and a drive shaft. Also, the PDU 141 converts AC power generated by the motor generator MG when the wheels are decelerated into DC power and outputs it to the main positive busbar MPL and the main negative busbar MNL as a regeneration power.

A first storage battery 111 and a second storage battery 121 which are included in the power storage device 100 are charged by the regeneration power generated by the motor generator, and an external power from an external power supply 153.

A charging converter 151 is provided between the main positive busbar MPL and the main negative busbar MNL and the power reception section 152. Further, the charging converter 151 converts the AC power supplied from the external power supply 153 (for example, a household AC power supply) via a power reception section 152 into the DC power to output to the main positive busbar MPL and the main negative busbar MNL. The power reception section 152 is an input terminal for receiving an input of the AC power supplied from the external power supply 153. It should be noted that in lieu of or otherwise in addition to the main positive busbar MPL and the main negative busbar MNL, the charging converter 151 may be connected to a positive electrode line PL1 and a negative electrode line NL1, or may be connected to a positive electrode line PL2 and a negative electrode line NL 2.

The power storage device 100 includes a first electric storage module 101, a second electric storage module 102, and a charge/discharge circuit module 103. The first electric storage module 101 includes a first storage battery 111, a first voltage sensor 112, a first current sensor 113, and a first switch 114. The second electric storage module 102 has a similar configuration to the first electric storage module 101, and has a second storage battery 121, a second voltage sensor 122, a second current sensor 123, and a second switch 124. The charge/discharge circuit module 103 performs charge/discharge between the first storage battery 111 and the second storage battery 121. The charge/discharge circuit module 103 has a battery ECU 130 as a control section and a first VCU 131, a second VCU 132, and a third switch 133, which may function as charge/discharge circuits.

In the present embodiment, the first storage battery 111 functioning as the first electric storage section and the second storage battery 121 functioning as the second electric storage section are DC power supplies capable of charging/discharging, and include a secondary battery such as a lithium-ion battery or a nickel-hydrogen battery, a sodium-ion battery, a lithium-sulfur battery and the like. Other than these, an element capable of charging/discharging, such as a condenser, a capacitor, or the like, may also be included. However, the first storage battery 111 and the second storage battery 121 may be batteries which have characteristics different from each other. Specifically, the first storage battery 111 is a so-called high-output type battery, having a higher mass output density, which is an output power per unit mass, than the second storage battery 121. On the other hand, the second storage battery 121 is a so-called high-capacity type battery, having a higher mass energy density, which is a storage power per unit mass, than the first storage battery 111. The first storage battery 111 may have a higher volume output density, which is an output power per unit volume, than the second storage battery 121, and the second storage battery 121 may have a higher volume energy density, which is a storage power per unit volume, than the first storage battery 111. In this way, power which can be retrieved from the first storage battery 111 per unit mass or unit volume is larger than a power which can be retrieved from the second storage battery 121 per unit mass or each unit volume. On the other hand, power energy stored by the first storage battery 111 per unit mass or unit volume is smaller than a power energy stored by the second storage battery 121 per unit mass or unit volume. In this way, the first storage battery 111 has a poor energy density and an excellent output density, compared with the second storage battery 121.

The first storage battery 111 is connected to the first VCU 131 via the positive electrode line PL1 and the negative electrode line NL1. The first voltage sensor 112 detects a voltage between the positive electrode line PL1 and the negative electrode line NL1, i.e. a voltage $V_1$ of the first storage battery 111, and outputs the detected value to the battery ECU 130. The first current sensor 113 detects current $I_1$ which is input/output to/from the first storage battery 111 and outputs the detected value to the battery ECU 130.

The first switch 114 is a switch for opening/closing electric circuits of the positive electrode line PL1 and the negative electrode line NL1. It receives an opening/closing instruction signal $CW_1$ from the battery ECU 130 and switching the open state/closed state. The $V_1$ detected by the first voltage sensor 112 when the first switch 114 is in the open state is $OCV_1$ which is the OCV in the first storage battery 111.

The second storage battery 121 is connected to the second VCU 132 via the positive electrode line PL2 and the negative electrode line NL2. The second voltage sensor 122 detects a voltage between the positive electrode line PL2 and the negative electrode line NL2, i. e. a voltage $V_2$ of the second storage battery 121 and outputs the detected value to the battery ECU 130. The second current sensor 123 detects current $I_2$ input/output to/from the second storage battery 121 and outputs the detected value to the battery ECU 130.

The second switch 124 is a switch for opening/closing electric circuits of the positive electrode line PL2 and the negative electrode line NL2. It receives an opening/closing instruction signal $CW_2$ from the battery ECU 130 and switching the open state/closed state. The $V_2$ detected by the second voltage sensor 122 when the second switch 124 is in the open state is $OCV_2$ which is the OCV in the second storage battery 121.

It should be noted that the first current sensor 113 and the second current sensor 123 detect output currents (discharge currents) from the respectively corresponding storage batteries as positive values and detect input currents (charge currents and regeneration currents) as negative values. Although in FIG. 1 a configuration for detecting the currents of the respective positive electrode lines is shown, the configuration may be one for detecting the currents of the negative electrode lines.

The first VCU 131 is provided between positive and negative electrode lines (PL1 and NL1), and positive and negative electrode connection lines (BPL and BNL), receives the control signal $CV_1$ from the battery ECU 130, and performs a voltage conversion between the positive and negative electrode lines (PL1 and NL1), and the positive and negative electrode connection lines (BPL and BNL). The second VCU 132 is provided between t positive and negative electrode lines (PL2 and NL2), and the positive and negative electrode connection lines (BPL and BNL), receives the control signal $CV_2$ from the battery ECU 130, and performs a voltage conversion between the positive and negative electrode lines (PL2 and NL2), and the positive and negative electrode connection lines (BPL and BNL).

The positive electrode connection line BPL is connected to the main positive busbar MPL, and the negative electrode connection line BNL is connected to the main negative busbar MNL. In the connection section, a third switch 133 is provided. The third switch 133 is a switch for opening/closing electric circuits of the positive electrode connection line BPL and the main positive busbar MPL, and of the negative electrode connection line BNL and the main negative busbar MNL. It receives an opening/closing instruction signal $CW_3$ from the battery ECU 130, and switches the open state/closed state.

In the above configurations, in a case where the first switch 114 and the third switch 133 are in the closed state and the second switch 124 is in the open state, the power in the first storage battery 111 is supplied to the PDU 141. Also, in a case where the second switch 124 and the third switch 133 are in the closed state and the first switch 114 is in the open state, the power in the second storage battery 121 is supplied to the PDU 141. Further, in a case where the first switch 114, the second switch 124, and the third switch 133 are in the closed state, the power in the first storage battery 111 and the power in the second storage battery 121 are supplied together to the PDU 141. However, when the power in the first storage battery 111 and the power in the second storage battery 121 are supplied together to the PDU 141, a voltage conversion is performed by the first VCU 131 and the second VCU 132, such that the supplied voltages are the same. It should be noted that when the regeneration power is supplied from the PDU 141, or when an external power from the external power supply 153 is supplied, the power flow is in a reverse direction to the direction in each case described above.

Also, in the present embodiment, a so-called 2 VCU type is adopted, in which a VCU being a voltage conversion unit is provided in each storage battery; however, in terms of adjustment of the output voltage of one storage battery with respect to the output voltage of the other storage battery, a so-called 1 VCU type may be adopted, in which one VCU is provided in either of the storage batteries. The 1 VCU type contributes to a reduction of space for arranging the VCU. Also, it contributes to cost reduction and weight reduction as well. In this case, the voltage supplied to the PDU 141 is the output voltage of the storage battery in which the VCU is not provided, so if this restriction is inconvenient, the 2 VCU type may be adopted.

It should be noted that converters are roughly categorized into a step-up type, a step-down type, and a step-up/down type, and any type of the converters may be adopted for the first VCU 131 and the second VCU 132. Also, the types of the converters adopted for the first VCU 131 and the second VCU 132 may be different from each other. By appropriately combining the converter types of the first storage battery 111 and the second storage battery 121, they as a whole can be utilized as one battery that satisfies a requested specification.

In a case where the first switch 114 and the second switch 124 are in the closed state and the third switch 133 is in the open state, the charge/discharge is performed between the first storage battery 111 and the second storage battery 121. For this charge/discharge between the storage battery sections, the power flow is determined in accordance with a difference between a conversion voltage value of the first VCU 131 determined by the control signal $CV_1$ from the battery ECU 130 and a conversion voltage value of the second VCU 132 determined by the control signal $CV_2$. Therefore, the battery ECU 130 can perform control to determine which storage battery is to supply power and which storage battery is to receive power by sending, to the respective VCUs, the control signals $CV_1$ and $CV_2$ which instruct the conversion voltage values. It should be noted that the control may be performed so as to stop the voltage conversion, to control in a so-called direct coupling mode for outputting the output voltage of the storage battery as it is, and to change the other conversion voltage value by fixing a high-side switch of one of the first VCU 131 and the second VCU 132 to the "closed" state as well as a low-side switch of the other to the "open" state. At this time, the battery ECU 130 can grasp a charge/discharge amount in the first storage battery 111 by monitoring $V_1$ and the $I_1$, and can grasp a charge/discharge amount in the second storage battery 121 by monitoring the $V_2$ and the $I_2$.

As described above, the power storage device 100 in the present embodiment includes two storage batteries having characteristics different from each other. A system using a plurality of the storage batteries having characteristics different from each other needs to finely control how to respond a requested power supply in accordance with the characteristics or states of the respective storage batteries. Here, at first, a difference in power outputs between a case of using a single storage battery and a case of using a plurality of storage batteries having different characteristics will be described.

Figure 2:
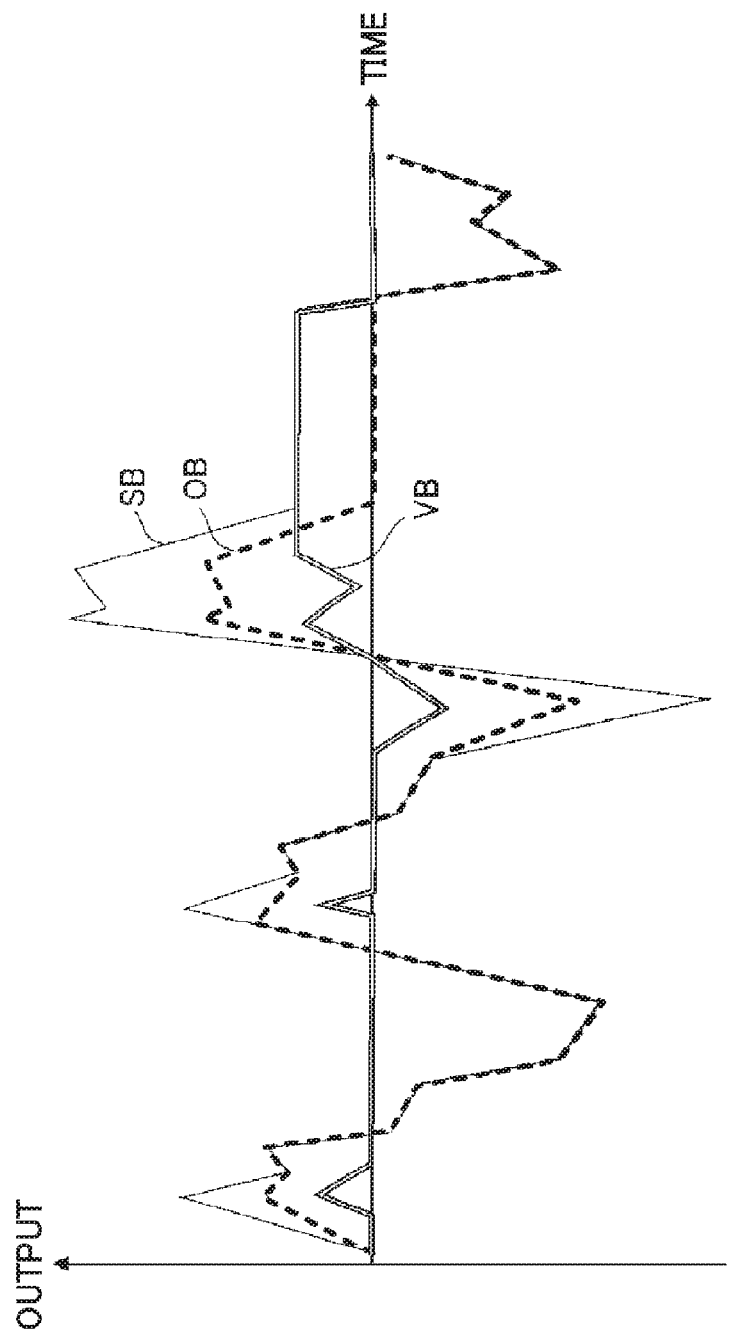
FIG. 2 shows a drawing for a comparison of power outputs between a case of using a single storage battery and a case of using two storage batteries.

FIG. 2 is a drawing for a comparison of power outputs between a case of using a single storage battery and a case of using two storage batteries having different characteristics. The horizontal axis indicates the lapse of time, and the vertical axis indicates the power output. An area in which the power output is negative indicates that the regeneration power is input, for example.

SB shown by the solid line indicates an output power change in a case where the power storage device is configured with one storage battery. In a case where the power storage device includes only one storage battery, power requested by the load side is output as requested in the capability range and input power is accepted as it is. Therefore, there may also be a case where a large output/input is performed within a short period of time, and there is a problem that the storage battery is rapidly degraded and the like as well.

In a case where a power storage device is configured with two storage batteries having different characteristics, the output/input can be shared in accordance with the respective characteristics. OB shown by the dotted line indicates an output power change of a high-output type battery, and VB shown by double lines indicates an output power change of a high-capacity type battery. At each time, an SB value is obtained by adding an OB value to a VB value. That is, a situation is shown, where the power requested by the load side is shared by the high-capacity type battery and the high-capacity type battery.

In the high-capacity type battery, generally, since the degradation progresses due to high output/input and an immediate change of the output/input, it is preferable to control the output/input to be performed in a range in which the degradation progress is suppressed. Therefore, as it can be seen from the change in the OB and the VB, if a large output/input is requested by the load side, the high-output type battery (OB) performs the control basically, and if the high-output type battery is not able to support, the high-capacity type battery (VB) assists the output/input. Also, the high-capacity type battery is adapted in a case where the output is continued with a value which is not very high, and in this case, the output of the high-output type battery can be suppressed. Also, since the high-capacity type battery has a characteristic that it degrades easily if accepting a regeneration power corresponding to a high-rate charge, a control is performed in which the regeneration power is accepted by the high-output type battery as much as possible. It should be noted that if the regeneration power is greater than the capacity that the high-output type battery can accept, the generation of the regeneration power may be reduced by operating a brake, other than using the high-capacity type battery to accept. In this case, the degradation of the high-capacity type battery can be suppressed.

Also, the high-capacity type battery and the high-output type battery have influences of degradation respectively based on the SOCs, which are also significantly different from each other. For the high-capacity type battery, the influence of degradation does not greatly change even if the SOC changes. In other words, the degradation progress is not greatly influenced by the SOC even if any value. On the other hand, for the high-output type battery, as the SOC changes, the influence of degradation changes greatly in accordance with the value. To describe in more detail, although the influence of degradation of the high-output type battery is small in a central area in which the SOC is 30% to 70%, the influence of degradation becomes larger as it is away from this central area. That is, the degradation progresses more as it is away from the central area. Therefore, it is preferable to adjust the charge/discharge amounts of the high-capacity type battery and the high-output type battery such that the SOC of the high-capacity type battery is not belonged to a low area of 0% to 30% or a high area of 70% to 100%.

In this way, by utilizing the plurality of storage batteries having different characteristics, various output requests from the load side can be supported while the degradations of the respective storage batteries can be suppressed. However, it is important to precisely grasp the present states of the storage batteries to appropriately change or modify in accordance with the states how the respective storage batteries are properly used and in what proportion the output/input are combined. In particular, for a drive control of a transport device, it is very important to precisely grasp the SOC which changes moment by moment.

Figure 3:
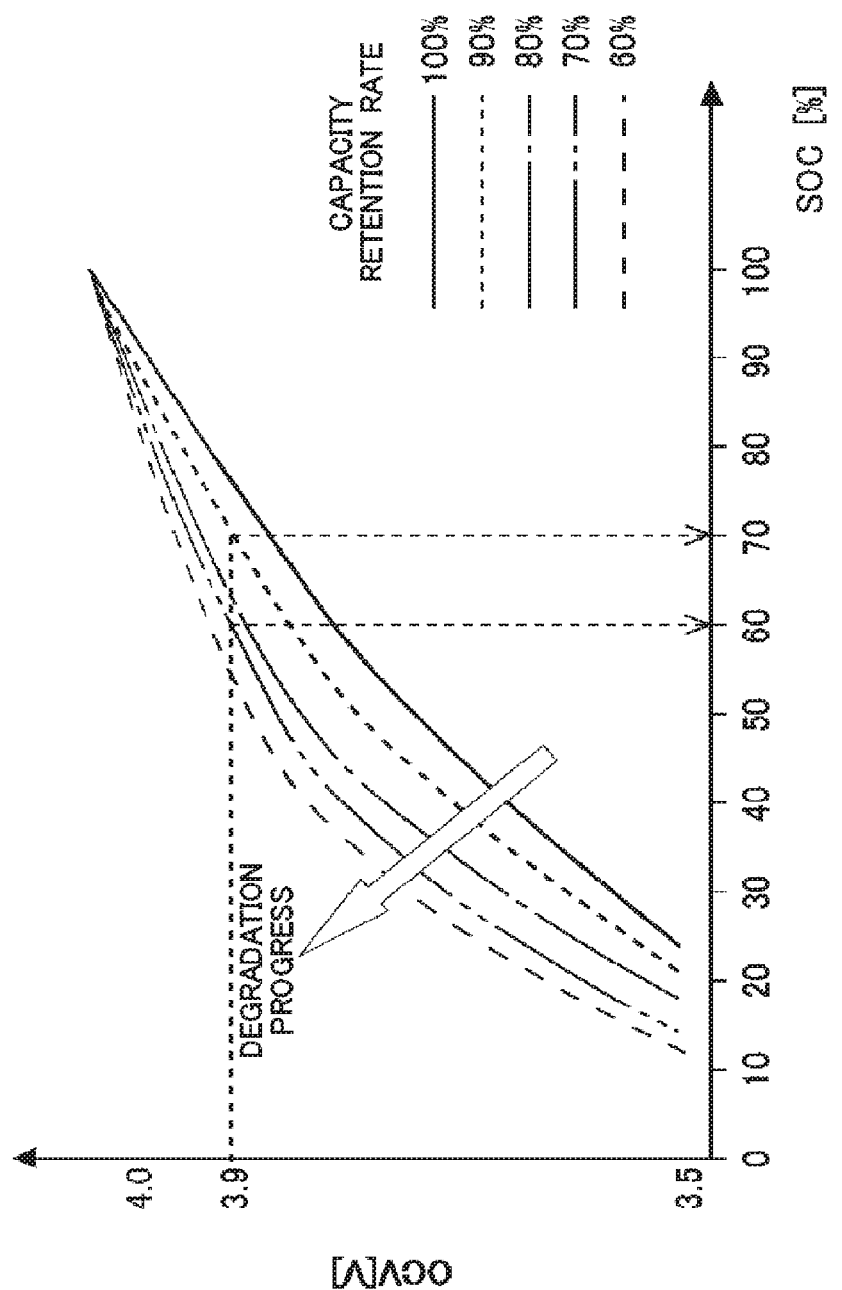
FIG. 3 shows a drawing for describing SOC-OCV curves of a storage battery.

Here, a correlation between the SOC and the OCV in the storage battery will be described. FIG. 3 is a graph showing SOC-OCV curves of a battery. The SOC-OCV curve is one example of correlation information which is a relation between the SOC and the OCV. The horizontal axis indicates the SOC by percent (%) and the vertical axis indicates the OCV by volt (V).

A plurality of curves drawn in the graph indicate the SOC-OCV curves with respect to the respective different capacity retention rates. The capacity retention rates show the degradation due to repeated uses or the degree of the degradation with the lapse of time, and specifically, indicate by percent the electricity amounts which can be stored if fully charged relative to the electricity amount (100%) which can be stored when the battery is new. For example, when the battery is charged to be fully charged at a time point when the battery has been repeatedly used, the storage battery in which only 80% of the electricity amount relative to the initial storage electricity amount can be stored is a storage battery having the capacity retention rate of 80%. In other words, it can be said that the capacity retention rate indicates a degree of degradation of the storage battery.

In FIG. 3, the solid line indicates the SOC-OCV curve having the capacity retention rate of 100%, the dotted line indicates 90%, the one-dot chain line indicates 80%, the two-dot chain line indicates 70%, and the dashed line indicates 60%. It should be noted that the SOC when having the capacity retention rate that is not 100% is the charge rate when the storage electricity amount fully charged in a state where the degradation has progressed is considered as 100%. It can be seen that the curve entirely transits in an upper-left direction as the degradation progresses. For example, in a case where the OCV is 3.90V, it can be seen that while the SOC when having the capacity retention rate of 90% is 70%, the SOC when having the capacity retention rate of 70% is 60%. Many storage batteries generally show a property with such a tendency.

That is, depending on the degree of the degradation of the storage battery mounted on the power storage device progresses at the present time, the SOCs to be estimated by the same OCV will be greatly different. In other words, if the degradation state of the storage battery is not considered, the SOC cannot be precisely grasped even though measuring the OCV.

Here, the power storage device 100 in the present embodiment performs charge/discharge control, for determining the SOC-OCV curve, to each of the mounted first storage battery 111 and second storage battery 121 at each time point when a predetermined condition is satisfied.

Figure 4:
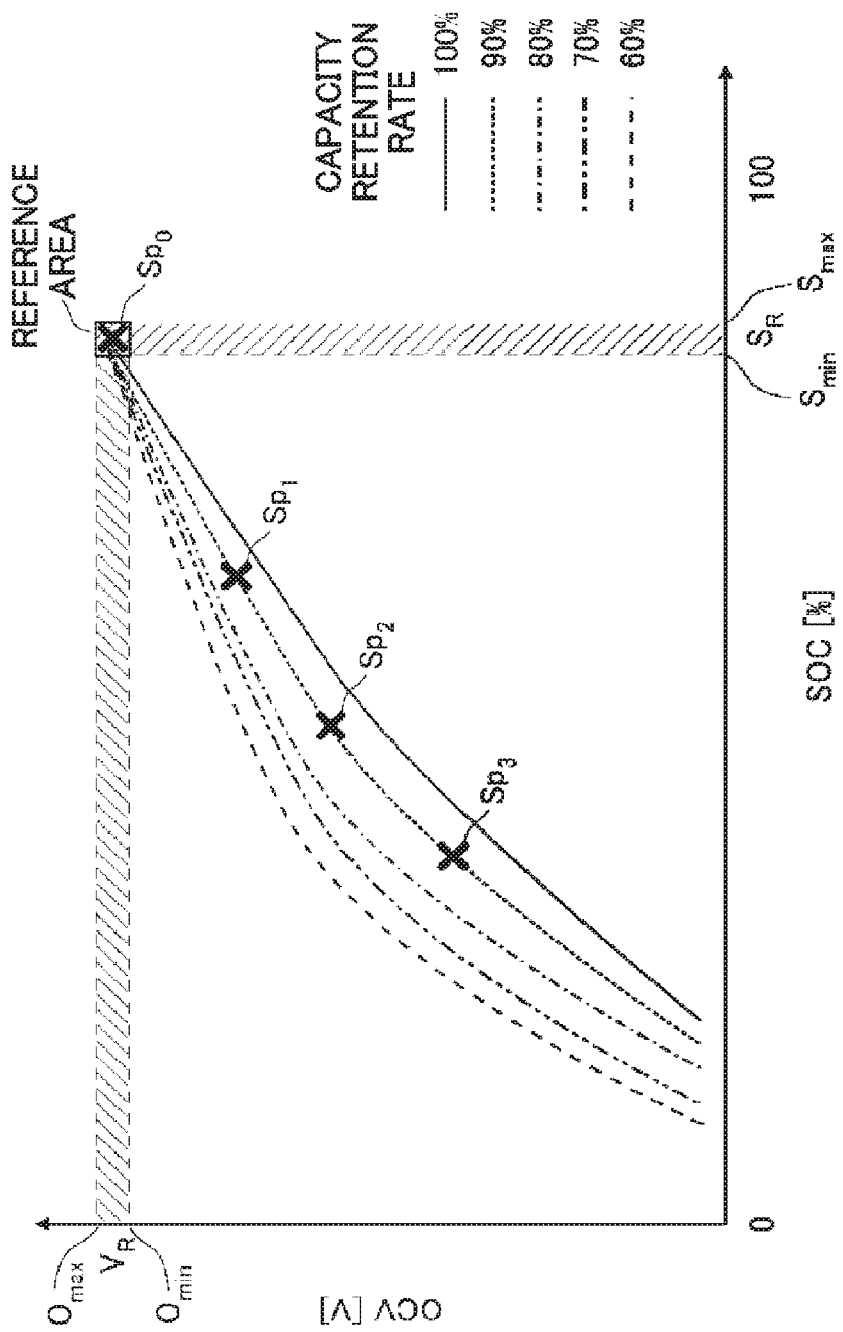
FIG. 4 shows a drawing for describing a procedure to a determination of the SOC-OCV curve.

FIG. 4 is a drawing for describing the procedure until the SOC-OCV curve is determined at a time point. Same as FIG. 3, the horizontal axis indicates the SOC by percent (%) and the vertical axis indicates the OCV by volt (V). Also, the shown plurality of curves respectively indicate the SOC-OCV curves for respective capacity retention rates of the modeled storage batteries in accordance with the line types used in FIG. 3.

The Applicant found that, as a result of repeated considerations for various storage batteries, an area in which a variation of an SOC with respective to an OCV falls in a constant range exists in many storage batteries, even the SOC-OCV curves have capacity retention rates different from each other. Such an area is called a "reference area". The reference area can be seen in a range in which the SOC is closed to 100%, for example. This is because that since the SOC in the fully charged voltage of the storage battery is defined as 100%, as the voltage of the storage battery is set to be in a vicinity of the fully charged voltage, the SOC becomes to be closed to 100%, independently of the capacity retention rate. In the example of FIG. 4, it is shown that when the OCV is in a range of $V_R(O_{min} \leq V_0 < O_{max})$, a residual capacity falls in a range of $S_R(S_{min} \leq S_0 < S_{max})$ given that the capacity retention rate may be any rate. The OCV in the range of $V_R$ is called a "reference OCV", and the SOC in the range of the $S_R$ is called a "reference SOC".

For the range of the reference area, it is preferable to set the range of the reference OCV as 0.1V (the difference between $O_{max}$ and $O_{min}$), and the range of the reference SOC as 3% (the difference between $S_{max}$ and $S_{min}$). The range of the reference OCV here may be the range of the voltage in a single cell. The range of the reference OCV may be 3% of the nominal voltage of the storage battery. The range of the reference area may be appropriately optimized in accordance with the characteristic of the storage battery to be the target or the requested accuracy and the like.

The power storage device 100 in the present embodiment can perform the charge/discharge between the storage battery sections between the first storage battery section 111 and the second storage battery section 121, as described above. That is, the power of one storage battery can be transferred to the other one. Accordingly, by performing the charge/discharge between the storage battery sections, the OCV of the storage battery on the side to determine the SOC-OCV curve can be moved into the range of the reference OCV in the storage battery. Since the SOC corresponding to the reference OCV is the reference SOC independently of the capacity retention rate, if setting the value as an average value of $S_{max}$ and $S_{min}$, for example, a coordinate $Sp_0$ ($St_0$, $Ot_0$) can be plotted in the reference area on a two-dimensional plane of the SOC-OCV (here, it is called as an "SO plane").

After that, in accordance with the predetermined condition and number of times, the charge/discharge between the storage battery sections is performed repeatedly. At this time, for example, in a case where the storage battery on the side to determine the SOC-OCV curve is the first storage battery 111, an increase/decrease amount of the SOC of the first storage battery 111 can be calculated by monitoring the current $I_1$ of the first current sensor 113. Also, if the first switch 114 is set to be in the open state, the OCV of the first storage battery 111 at that time can also be detected. Accordingly, for each time when performing the charge/discharge between the storage battery sections, one coordinate Sp can be plotted on the SO plane. In the example of FIG. 4, after obtaining the coordinate $Sp_0$ within the reference area, the charge/discharge between the storage battery sections is repeatedly performed for three times to obtain coordinates $Sp_1$, $Sp_2$, and $Sp_3$.

For example, depending on the battery makers, the SOC-OCV curve with respect to each capacity retention rate for each model number of the storage battery is prepared in advance as reference data. In FIG. 4, the SOC-OCV curves for respective 100%, 90%, 80%, 70%, and 60% are the reference data. It is preferable that the reference data has been prepared in a finer proportion, such as per 5% or per 1% and the like. Or, for a range in which a variation of the SOC-OCV curves with respect to the capacity retention rates is large, the reference data may be provided in a finer proportion than a small range, and efforts required for preparation of the data amount and the reference data can be reduced. Specifically described later, the power storage device 100 stores this reference data in a storage section, and the battery ECU 130 can appropriately refer to the reference data.

As a plurality of coordinates Sp are obtained by repeatedly performing the charge/discharge between the storage battery sections, the battery ECU 130 selects, from the reference data by a matching process, an SOC-OCV curve having the highest matching degree to these coordinates. For example, an SOC-OCV curve having the smallest deviation from the plurality of coordinates Sp is selected. The SOC-OCV curve selected at this time is the most probable SOC-OCV curve at that time point. In this way, the SOC-OCV curve of the storage battery at that time point is estimated. In the example of FIG. 4, it is the SOC-OCV curve having the capacity retention rate of 90%. By prestoring this SOC-OCV curve, for a confirmation of the SOC requested from outside, an SOC with a high accuracy at that time point can be immediately returned as the OCV is measured. In this way, the SOC-OCV curve appropriately determined by performing the charge/discharge between the storage battery sections, since a real SOC-OCV curve at that time point is shown with higher fidelity, an SOC extremely closed to a real SOC can be returned to the confirmation request from the outside.

It should be noted that in the above-described description, although the charge/discharge between the storage battery sections is performed so as to first obtain the coordinate $Sp_0$ within the reference area, the order for obtaining the coordinates Sp is not limited to this. As a result of performing the charge/discharge between the storage battery sections for a plurality of times, as at least one coordinate Sp is included within the reference area, the matching process to the reference data can be performed. In a case where an undue charge/discharge between the electric storage sections is necessary in order to set the SOC and the OCV of one storage battery in the reference area, it is preferable to move the voltage and the SOC of the storage battery generating the SOC-OCV curve into the reference area while obtaining a plurality of coordinates, by performing the charge/discharge between the electric storage sections for a plurality of times. Then, by modifying the coordinates obtained by the charge/discharge between the electric storage sections for a plurality of times based on the reference area, a precise SOC-OCV curve can be generated, without any need of the undue charge/discharge between the electric storage sections just for setting the voltage and the SOC of the electric storage section generating the SOC-OCV curve in the reference area.

Also, in the above-described description, although the SOC-OCV curve having the highest matching degree is selected from the reference data, the selection may be at first, made from a plurality of SOC-OCV curves having deviations of the respective coordinates not more than a threshold, and next, one SOC-OCV curve may be determined based on other references from those. As the other references, such as that a deviation is smaller as the coordinate is newly acquired and the like can be given. With such a configuration, the SOC-OCV curve can be specified even if in a state where the charge/discharge between the electric storage sections has to be stopped on the way of performing due to some situations.

Figure 5:
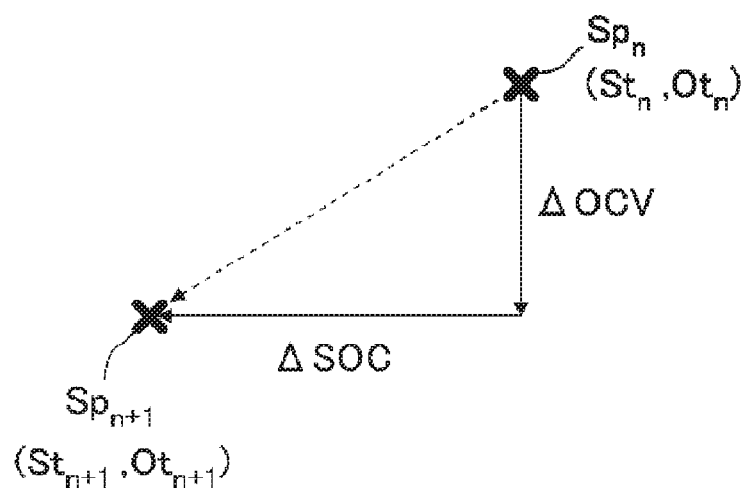
FIG. 5 shows a drawing for describing a computation for determining a coordinate in a planar space.

Here, a procedure of performing the charge/discharge between the storage battery sections and determining the next coordinate Sp will be described. FIG. 5 is a drawing for describing a computation for determining the coordinates on a planar space. $Sp_n$ shown as a first x mark is plotted as the nth coordinate on the SO plane and is shown by a coordinate value $(St_n, Ot_n)$. The n+1th coordinate plotted performing the charge/discharge between the storage battery sections for one time after this is $Sp_{n+1}$ shown as a second x mark.

Differences between the respective coordinate values are shown as ΔOCV for the OCVs, as ΔSOC for the SOCs, and may be respectively positive values in some cases, or may be negative values in some cases. That is: $(St_{n+1}, Ot_{n+1})$= $(St_n+ΔSOC, Ot_n+ΔOCV)$. Here, since $Ot_n$ and $Ot_{n+1}$ are both the OCVs, these values can be directly obtained by actual measurement. On the other hand, ΔSOC is: $ΔSOC=St_{n+1}-St_n$, and is calculated according to: $ΔSOC=ΣI/C_{full}$ or $ΔSOC=ΔAh/C_{full}$. Here, ΣI is a sum of values output by the current sensor from a time $t_n$ to a time $t_{n+1}$, and ΔAh indicates an electricity amount changed during this period. Also, $C_{full}$ is an electricity amount when fully charged at the time point of the former SOC-OCV curve determination. The value of $C_{full}$ is stored in the storage section for each time when the SOC-OCV curve is determined. For example, as the SOC-OCV curve is determined, $C_{full}$ is determined in accordance with the capacity retention rate and the initial capacity corresponding to the determined SOC-OCV curve.

It should be noted that in the above description, the process of determining the SOC-OCV curve has been mainly described using the coordinates SP on the two-dimensional plane for a purpose of describing easily understandably. Plotting the coordinates SP or specifying the coordinates SP corresponds to acquiring and storing data of (SOC, OCV), as an internal process. Also, in the above description, the process of determining the SOC-OCV curve has been mainly described by giving a case of acquiring one OCV for each SOC for a purpose of describing easily understandably as an example. However, one or more OCVs for each SOC may be acquired.

Figure 6:
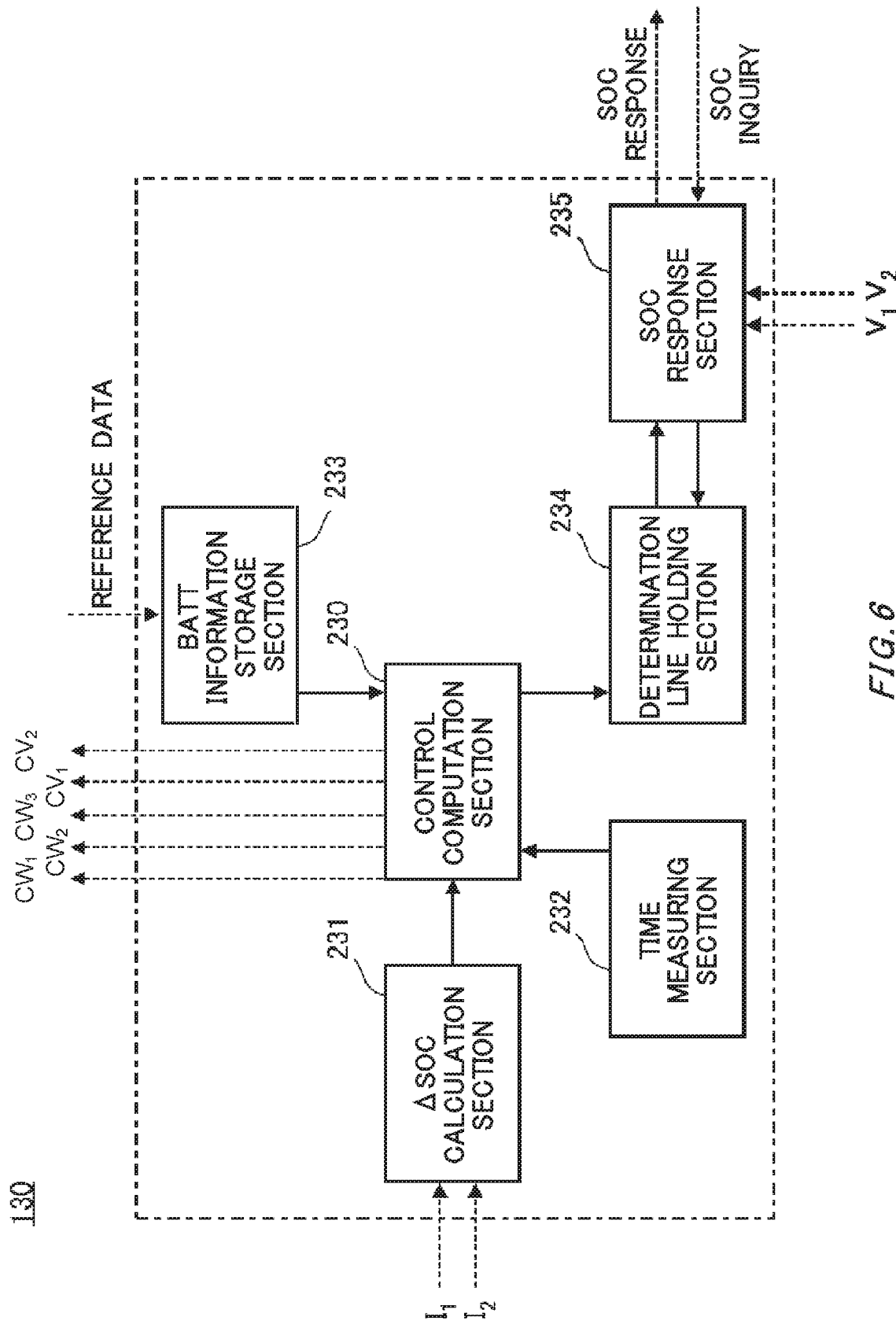
FIG. 6 shows an internal block diagram of a battery ECU.

The followings will describe how the battery ECU 130 performs determining the SOC-OCV curve described above by showing the battery ECU 130 with functional blocks. FIG. 6 shows an internal block diagram of the battery ECU 130 along with a recording medium 290 which stores a program for the battery ECU 130.

As illustrated, the battery ECU 130 includes a control computation section 230 performing an entire control and computation, a ΔSOC calculation section 231, a time measuring section 232, a BATT information storing section 233, and a determination line holding section 234. Processes until the SOC-OCV curve is determined are performed according to these functional blocks. In addition to these, the battery ECU 130 also mainly includes an SOC response section 235.

The control computation section 230 sets at least one of the first storage battery 111 and the second storage battery 121 as a target storage battery. The target storage battery refers to a storage battery to be an estimation target of the SOC-OCV curve, for example. The control computation section 230 may select at least one of the first storage battery 111 and the second storage battery 121 as the target storage battery in accordance with the predetermined selection conditions. The control computation section 230 may select the first storage battery 111 having a more excellent output density as the target storage battery if the first storage battery 111 and the second storage battery 121 are selected as the storage battery which is to be the estimation target of the SOC-OCV curve. The control computation section 230 acquires a target SOC and a target OCV which are respectively a charge rate and an open-end voltage of the target storage battery, collects, by using charge transfer between the first storage battery 111 and the second storage battery 121, data including the target SOC and the target OCV in an order based on a collection rule determined by collected data and the target SOC, the collected data being an aggregation of the data which is collected, and estimates correlation information between SOC and OCV of the target storage battery based on a plurality of the data. It should be noted that the data including the target SOC and the target OCV may be called (SOC, OCV) data in some cases.

The control computation section 230 may derive uncollected data which is an aggregation of data that is uncollected based on the collected data, and collect the (SOC, OCV) data in an order based on a collection rule determined based on an operation time including a time required for the charge transfer, the operation time calculated from a difference between the SOC included in the uncollected data and the target SOC. The control computation section 230 may control the charge/discharge circuit module 103 so as to collect the (SOC, OCV) data by giving a higher priority to SOC included in the uncollected data in which the operation time is shorter. The control computation section 230 may collect the (SOC, OCV) data in an order based on a collection rule determined based on an operation time including an acquisition time which is a time required for acquiring the target SOC and the target OCV. The acquisition time may include the time required until the temporal change of the voltage of the target electric storage section is stable after the charge transfer. The acquisition time may be based on a difference between a number of the (SOC, OCV) data which is to be collected for each SOC and a number of the data which is included in the collected data and is already collected with respect to the target SOC. The number of the (SOC, OCV) data to be collected for each SOC may be two or more. The number of the (SOC, OCV) data to be collected for each SOC may be one. The control computation section 230 may select with higher priority an order in which a total value of the operation time for collecting each (SOC, OCV) data of the uncollected data becomes smaller.

It should be noted that the control computation section 230 may acquire the target SOC based on the charge transfer amount to the target storage battery from the time when the SOC of the target storage battery is included in a range of the reference SOC which is the SOC in which a difference of the OCVs relative to the same SOC in a plurality of degradation states of the target storage battery is not more than a threshold. Also, the control computation section 230 may acquire the target SOC based on the charge transfer amount to the target storage battery from the time when the OCV of the target storage battery is included in the range of the reference OCV which is the OCV corresponding to the reference SOC. The control computation section 230 may collect the (SOC, OCV) data such that the reference SOC and the reference OCV are included as the target SOC and the target OCV.

When the SOC of the target storage battery before performing the charge transfer is not included in the range of the reference SOC, the control computation section 230 may perform, prior to the charge transfer, the charge/discharge between the first storage battery 111 and the second storage battery 121 such that the SOC of the target storage battery is included in the range of the reference SOC. When the OCV of the target storage battery before performing the charge transfer is not included in the range of the reference OCV, the control computation section 230 may perform the charge/discharge between the first storage battery 111 and the second storage battery 121 such that the OCV of the target storage battery is included in the range of the reference OCV.

At least one of the first storage battery 111 and the second storage battery 121 supplies power to a motor generator MG. It should be noted that the motor generator MG is one example of the driving section. The charge/discharge circuit module 103 may perform the charge/discharge between the first storage battery 111, the second storage battery 121, and the motor generator MG. The control computation section 230 may control the charge/discharge circuit module 103 so as not to perform the charge/discharge between the first storage battery 111 and the driving section, and between the second storage battery 121 and the driving section during a period of performing the charge transfer.

It should be noted that the battery ECU 130 is one type of computer. The control computation section 230 is, for example, configured with a MPU, for example, executes a program stored in an internal storage section of the MPU, and controls the entire power storage device 100 in accordance with the program. The program executed by the battery ECU 130 is supplied from the recording medium 290 to the battery ECU 130. It should be noted that the recording medium 290 is one example of a medium which is readable by a computer. In the battery ECU 130, any medium in which a program or a computer instruction is stored can be considered as a medium for storing the program for the battery ECU 130.

The control computation section 230 controls the charge/discharge circuit module 103. Also, the control computation section 230 sends opening/closing instruction signals $CW_1$, $CW_2$, and $CW_3$ respectively toward a first switch 114, a second switch 124 and a third switch 133 to open/close them depending on the situations. Also, the control signals $CV_1$ and $CV_2$ which are PWM signals are sent respectively toward a first VCU 131 and a second VCU 132 to adjust their conversion voltages. The ΔSOC calculation section 231 acquires $I_1$ from the first current sensor 113 and calculates ΔSOC when acquiring the (SOC, OCV) data of the first storage battery 111. Similarly, $I_2$ is acquired from the second current sensor 123 and ΔSOC is calculated when acquiring the (SOC, OCV) data of the second storage battery 121. The ΔSOC calculation section 231 hands off the calculated ΔSOC to the control computation section 230.

The time measuring section 232 hands off the time when the charge/discharge between the storage battery sections is performed to the control computation section 230. The control computation section 230 prestores the time when the (SOC, OCV) data is acquired in the internal storage section, and if the time when the (SOC, OCV) data is acquired is beyond the predetermined lapse time, excludes the (SOC, OCV) data from the matching process target.

The BATT information storing section 233 is a storage section for storing the above-described reference data. Specifically, the BATT information storing section 233 is configured with a non-volatile flash memory and the like. The BATT information storing section 233 acquires the reference data from an external device. It should be noted that the BATT information storing section 233 stores various information about the storage battery, not limited to storing the reference data, and provides the information to the control computation section 230 if necessary. The BATT information storing section 233 prestores correlation information between SOCs and OCVs in a plurality of degradation states of the first storage battery 111. The BATT information storing section 233 prestores correlation information between SOCs and OCVs in a plurality of degradation states of the second storage battery 121. For example, when manufacturing the power storage device 100, the correlation information between the SOCs and the OCVs in the plurality of degradation states of the first storage battery 111 and the correlation information between the SOCs and the OCVs in the plurality of degradation states of the second storage battery 121 are stored in the BATT information storing section 233. It should be noted that among the first storage battery 111 and the second storage battery 121, for the storage battery which is not to be the estimation target of the SOC-OCV curve, the correlation information may not be stored in the BATT information storing section 233. The control computation section 230 may select with higher priority, among the correlation information between the SOCs and the OCVs in the plurality of degradation states of the target storage battery stored in the BATT information storing section 233, the correlation information having a higher adaptability to a plurality of (SOC, OCV) data including the target SOC and the target OCV, as estimated correlation information. The control computation section 230 may estimate the correlation information based on an approximate curve or an approximate straight line relative to the plurality of data including the target SOC and the target OCV.

The determination line holding section 234 is a storage section to store the SOC-OCV curve determined by the control computation section 230. Specifically, the determination line holding section 234 is configured with a non-volatile flash memory and the like. The determination line holding section 234 may be configured integrally with the BATT information storing section 233 as the storage section.

The SOC response section 235 is connected to the determination line holding section 234. As the SOC response section 235 receives an inquiry about the SOC from outside, the SOC response section 235 acquires $V_1$ and $V_2$ as the OCVs, refers to the SOC-OCV curves stored in the determination line holding section 234, and returns the SOC. In a case where the correlation information of the first storage battery 111 is estimated by the control computation section 230, when the SOC response section 235 receives the inquiry about the SOC of the first storage battery 111, the SOC response section 235 calculates the SOC of the first storage battery 111 to respond, based on the OCV of the first storage battery 111 and the correlation information estimated by the control computation section 230. In a case where the correlation information of the second storage battery 121 is estimated by the control computation section 230, when the SOC response section 235 received the inquiry about the SOC of the second storage battery 121, the SOC response section 235 calculates the SOC of the second storage battery 121 to respond, based on the OCV of the second storage battery 121 and the correlation information estimated by the control computation section 230.

Figure 7:
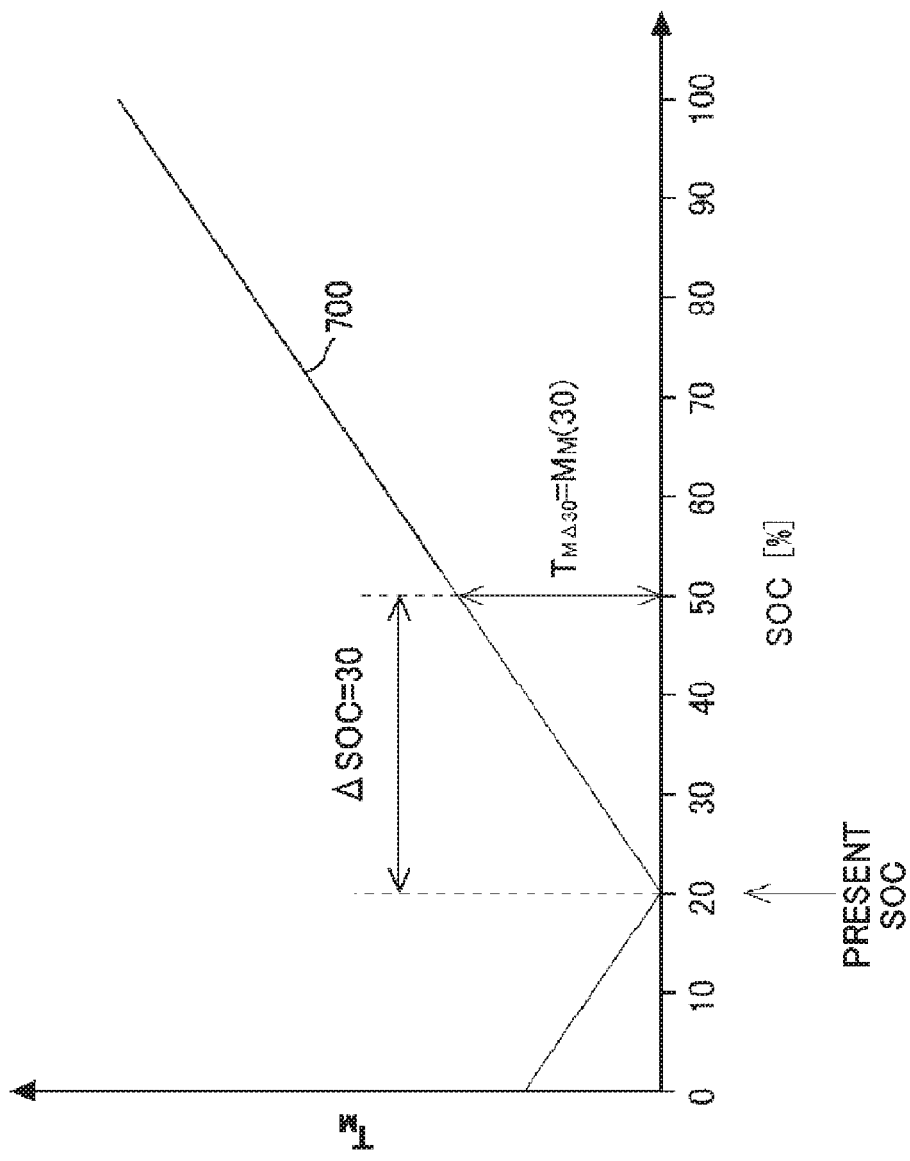
FIG. 7 shows a drawing for indicating information for calculating a time $T_M$ required for charge transfer.

FIG. 7 is a drawing showing the information for calculating a time $T_M$ required for the charge transfer. The horizontal axis indicates the SOC by percent (%), and the vertical axis indicates the time $T_M$. The mapping line 700 shows the time required from a state where the SOC is 20% to a state where the SOC becomes a value shown by the horizontal axis by the charge/discharge between the storage battery sections. As illustrated, $T_M$ is approximately proportional to $\Delta SOC$ which is a magnitude of the difference of the SOCs before and after the charge transfer. As one example, the time $T_M$ when the magnitude of $\Delta SOC$ is 10% is at least above several minutes, and may be above 10 minutes in many cases. The BATT information storing section 233 may store the mapping table $M_M$ of mapping $\Delta SOC$ to the time $T_M$ as the information showing the mapping line 700.

The control computation section 230 refers to the mapping table stored by the BATT information storing section 233 and calculates the time $T_M$ from $\Delta SOC$. For example, the control computation section 230 calculates, by using 30% which is $\Delta SOC$ and the mapping table $M_M$, the time $T_{M\Delta 30}$ required from a state where the present SOC is 20% to a state where the SOC becomes to 50% by the charge/discharge between the storage battery sections.

Figure 8:
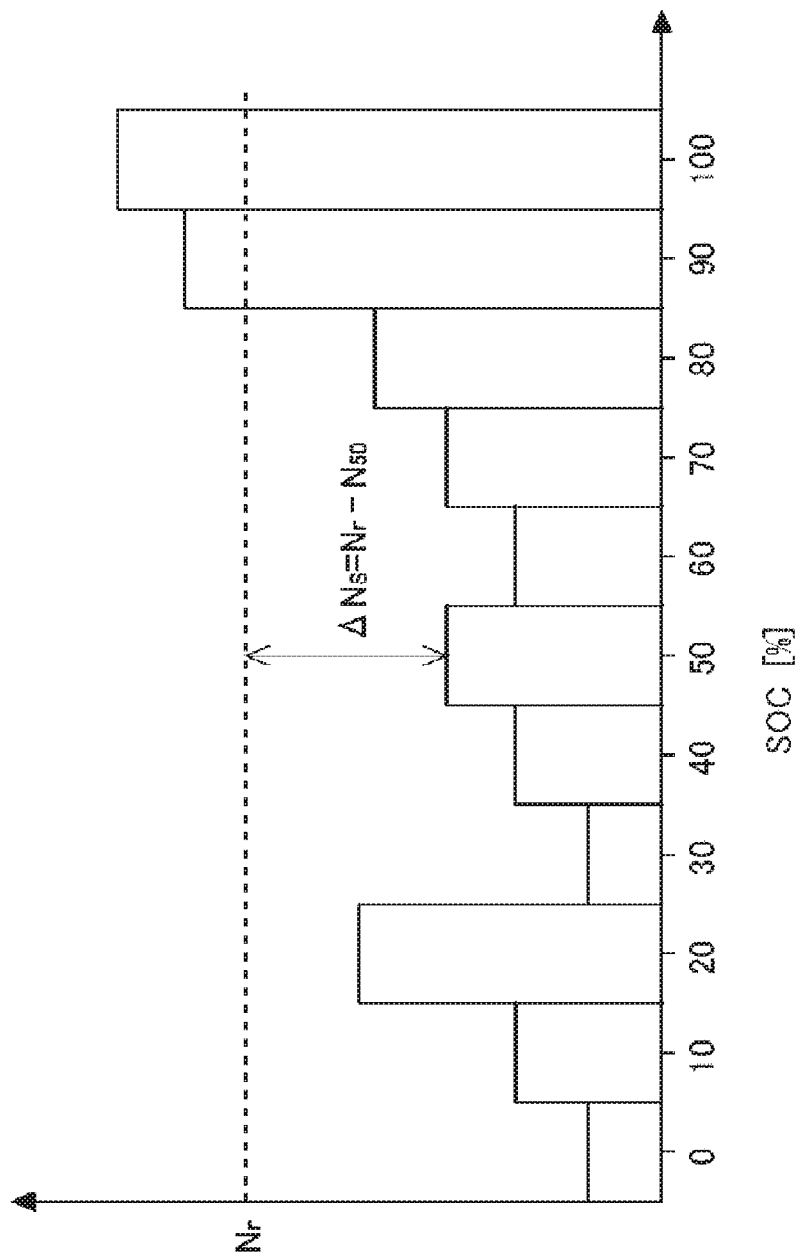
FIG. 8 shows a drawing for indicating data used in a calculation of an acquisition time of (SOC, OCV) data.

FIG. 8 is a drawing showing data used for calculating the acquisition time of the (SOC, OCV) data. FIG. 8 shows statistic information of the collected data already collected in a histogram mode.

The horizontal axis indicates the SOC by percent (%), and the vertical axis indicates a number of the collected data. The control computation section 230 calculates the time $T_T$ required for acquiring the (SOC, OCV) data by using the statistic information about the collected data.

The control computation section 230 calculates, based on $\Delta N_S$, the time $T_{TS}$ required for acquiring the data in which the SOC is S %. Here, $\Delta N_S = N_r - N_S$. $N_S$ is a number of the data corresponding to the SOC which is S % among the data included in the collected data. $N_r$ is a predetermined number of data to be collected for each SOC. It should be noted that $N_r$ may be constant, independently of the SOC. $N_r$ may be a different value in accordance with the SOC.

The BATT information storing section 233 stores the mapping table $M_T$ of mapping $\Delta N_S$ to the time $T_T$ required for acquiring the data of the SOC and the OCV. The control computation section 230 refers to the mapping table $M_T$, and calculates the time required for acquiring the data by $M_T(\Delta N_S)$. For example, in a case where the time $T_T$ required for acquiring the data in which the SOC is 50%, the control computation section 230 calculates $\Delta N_{50} = N_r - N_{50}$, and calculates the time required for acquiring the data in which the SOC is 50% by $T_{T50} = M_T(\Delta N_{50})$.

Here, a time $T_N$ required for acquiring one (SOC, OCV) data will be described. $T_N$ includes a time $T_d$ required from timing when the SOC reaches an acquisition target $SOC_t$ being an SOC of the data acquisition target to a time when a measurement value of the OCV is acquired for one time. $T_d$ includes a time for waiting for that the temporal change of a terminal voltage of the storage battery is stable. The terminal voltage in an open-path state after the charge/discharge of the storage battery changes relatively gradually with time in many cases, and a constant period of time is required until the temporal change of the terminal voltage can be substantially neglected. For that reason, the control computation section 230 waits for the lapse of the time when the temporal change of the terminal voltage of the storage battery is stable, and then acquires the measurement value of the terminal voltage. Therefore, at least the time $T_d$ is required from the timing when the SOC reaches the acquisition target $SOC_t$ to the time when the measurement value of the OCV is acquired for one time. If $\Delta N=1$, $T_N=T_d$. Therefore, if $\Delta N=1$, the control computation section 230 calculates the $T_{TS}$ by $T_{TS}=T_d$.

Next, a case where $\Delta N \geq 2$ will be described. As above-described, the time until the measurement value of the OCV for the first time is acquired is $T_d$. The measurement for the OCV for the second time is to change the SOC by a regulated amount $\Delta SOC_T$ according to the charge/discharge between the storage battery sections, followed by changing the SOC to the original acquisition target $SOC_t$ again by the charge/discharge between the storage battery sections, and waits for the lapse of the time when the temporal change of the terminal voltage is stable, and then acquires the measurement value of the terminal voltage. Therefore, after the measurement value of the OCV is acquired for the first time, a time of $2 \times M_M(\Delta SOC_T) + T_d$ is required until the measurement value of the OCV for the second time is acquired. In this case, the time $T_{NS}$ until the measurement value of the OCV for the $\Delta N_S$ times is acquired is to be $T_{NS} = T_d + (2 \times M_M(\Delta SOC_T) + T_d) \times (\Delta N_S - 1)$.

$\Delta SOC_T$ may be, for example, approximately 10%. For $SOC_t + \Delta SOC_T$ or $SOC_t - \Delta SOC_T$, $\Delta SOC_T$ may be selected so as to match to another $SOC_t'$ being the data collection subject. In this case, the measurement of the OCV in $SOC_t + \Delta SOC_T$ or $SOC_t - \Delta SOC_T$ may be performed, and the data of $(SOC_t', OCV)$ acquired by this may be stored as the collected data. In this case, $T_{NS}$ is to be $T_{NS} = T_d + (2 \times M_M(\Delta SOC_T) + 2 \times T_d) \times (\Delta N_S - 1)$. It should be noted that $\Delta SOC_T$ may be selected such that $SOC_t'$ matches the SOC closest to $SOC_t$. In this way, by matching $SOC_t + \Delta SOC_T$ or $SOC_t - \Delta SOC_T$ to the SOC being the data collection subject, the time required for collecting all of the (SOC, OCV) data can be shortened in some cases. Even if the time required for collecting all of the (SOC, OCV) data cannot be shortened, the calculation accuracy of the SOC-OCV curves can be increased in some cases by increasing the measurement points.

Figure 9:
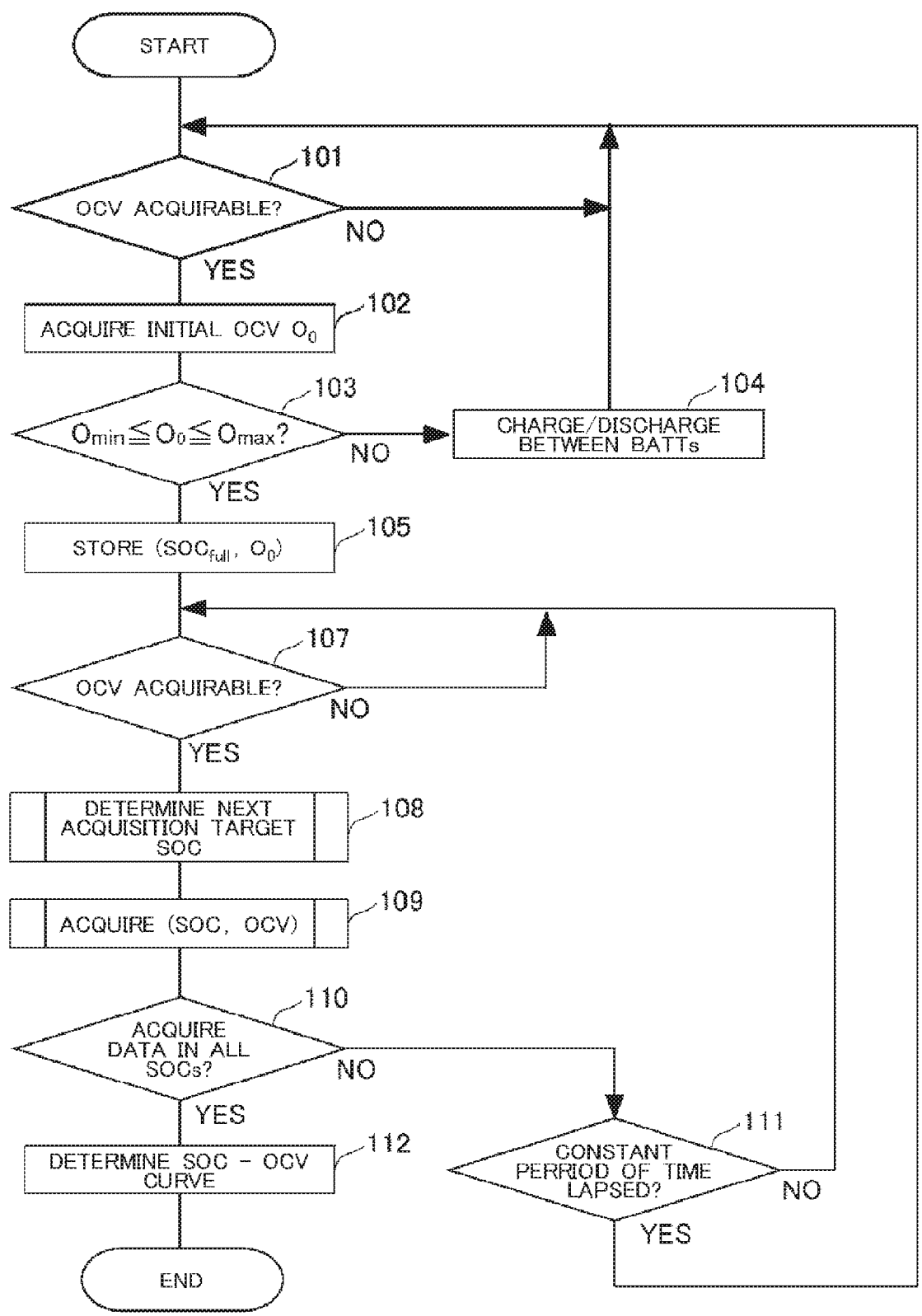
FIG. 9 shows a flow chart for a determination of the SOC-OCV curve.

FIG. 9 is a flow chart for the determination of the SOC-OCV curve. The flow starts from a time point when the battery ECU 130 receives an instruction for determining the SOC-OCV curve from a control section of the transport device 10. It should be noted that here, a case will be described where the first storage battery 111 is selected as the target electric storage section to determine the SOC-OCV curve of the first storage battery 111.

The control computation section 230 determines whether the OCV of the first storage battery 111 is acquirable or not at a step S101. For example, in a case where the PDU 141 requests supply of power, since the first switch 114 and the third switch 133 are set to be in the closed state by giving priority to the request, the control computation section 230 determines that the OCV is not acquirable. In this case, the control computation section 230 standbys until the state where the OCV is acquirable.

If determining that the OCV is acquirable, the control computation section 230 proceeds to a step S102 and sends the opening/closing instruction signal $CW_1$ to the first switch 114, and sets the first switch 114 to be in the open state. Then, $V_1$ is acquired from the first voltage sensor 112 and the voltage value is set to be $O_0$ which is the initial OCV. The control computation section 230 determines whether the acquired $O_0$ is included in the range of the reference OCV or not at a step S103. Specifically, the control computation section 230 acquires the refer information of the first storage battery 111 from the BATT information storing section 233 and refers to the range from $O_{min}$ to $O_{max}$ of the reference OCV. Then, the control computation section 230 determines whether the relation of $O_{min} \leq O_0 < O_{max}$ is satisfied or not.

If determining that the acquired $O_0$ is not included in the range of the reference open voltage, the control computation section 230 proceeds to a step S104 and performs the charge/discharge between the storage battery sections. Specifically, the control computation section 230 sends the opening/closing instruction signals $CW_1$, $CW_2$, and $CW_3$ respectively toward the first switch 114, the second switch 124, and the third switch 133, and sets the first switch 114 and the second switch 124 to be in the closed state and the third switch 133 to be in the open state. Then, the control signals $CV_1$ and $CV_2$ are sent to the respective VCUs, and the conversion voltage value of the second VCU 132 is set as a value higher than the conversion voltage value of the first VCU 131. Just then, since the second storage battery 121 is in the discharge state and the first storage battery 111 is in the charge state, constant electric charges move from the second storage battery 121 to the first storage battery 111. The control computation section 230 may change the moved charge amounts by adjusting the opening/closing time of each switch and adjusting the conversion voltage value of each VCU. Also, the control computation section 230 may determine the moved charge amounts in accordance with the difference between the acquired $O_0$ and the range from $O_{min}$ to $O_{max}$ of the reference OCV.

It should be noted that when the charge/discharge between the storage battery sections is performed by using two VCUs, only one VCU may be PWM controlled and the other VCU may perform a direct control. The direct control is a control for setting the high-side switch of the DC/DC converter only to the closed state to pass currents without stepping up/down the voltages. In a case of performing the direct control, for the control signals $CV_1$ and $CV_2$, "0" is designated as the instruction value of the conversion voltage.

As the charge/discharge between the storage battery sections is completed at the step S104, the processing returns back to the step S101 again, and this loop is repeated until the condition of the step S103 is satisfied. As the condition of the step S103 is satisfied, the processing proceeds to a step S105.

At the step S105, the control computation section 230 stores the data of $(SOC_{full}, OCV)$ to the internal storage section. Here, the $SOC_{full}$ is a value corresponding to SOC which is 100%. $SOC_{full}$ may be set as 100%. Also, $SOC_{full}$ may be set as a value which is not less than $S_{min}$ and not more than $S_{max}$. For example, in some cases, $SOC_{full} = (S_{min} + S_{max})/2$.

Steps S107 and after are processes for acquiring the (SOC, OCV) data by repeatedly performing the charge/discharge between the storage battery sections. The control computation section 230 determines whether the OCV is acquirable or not at the step S107. This determination is similar to the determination of the step S101. If the OCV is not acquirable, the control computation section 230 standbys until it becomes possible. If the OCV is acquirable, the processing proceeds to a step S108 to determine the SOC to be the next acquisition target, and to acquire the data of (SOC, OCV) at a step S109. Processes at steps S108 and S109 will be described later.

The control computation section 230 proceeds to a step S110 and determines whether $N_r$ or more pieces of data are acquired or not in the all SOCs being the acquisition targets. If determining that the acquisition is not done, the processing proceeds to a step S111.

The step S111 is carried out at a time point when the process of acquiring the next (SOC, OCV) data starts. At the step S111, a determination whether the $N_r$ or more pieces of data is acquirable or not within a determined period of time in the all SOCs being the acquisition targets is performed. For example, the control computation section 230 determines whether the predetermined regulated time lapsed or not from the time when acquiring the data stored at the step S105. The regulated time is set as 7 days, for example. The regulated time may be changed in accordance with a driving range, an environmental temperature, accuracy requested for the SOC-OCV curves and the like. If determining that the regulated time did not lapse, the control computation section 230 returns back to the step S107 and sequentially acquires the data in the SOC being the acquisition target. If determining that the regulated time lapsed, the processing returns to the step S101. In this case, the (SOC, OCV) data which has been acquired until then is discarded. By discarding the old data in this way, since the SOC-OCV curve is not determined by the data acquired in the different degradation states, the accuracy of the determined SOC-OCV curve is improved.

At the step S110, as determining that Nr or more pieces of data are acquired in the all SOCs being the acquisition targets, the processing proceeds to a step S112, and the control computation section 230 determines the SOC-OCV curve from the acquired plurality of data. Specifically, the control computation section 230 reads the reference data of the first storage battery 111 from the BATT information storing section 233, and selects, from the SOC-OCV curves with respect to the respective capacity retention rates, one having the highest matching degree to the acquired plurality of data. Then, the SOC-OCV curve selected in this way is stored in the determination line holding section 234 as the determined SOC-OCV curve. The control computation section 230 ends the series of processes after the determined SOC-OCV curve is stored in the determination line holding section 234.

Figure 10:
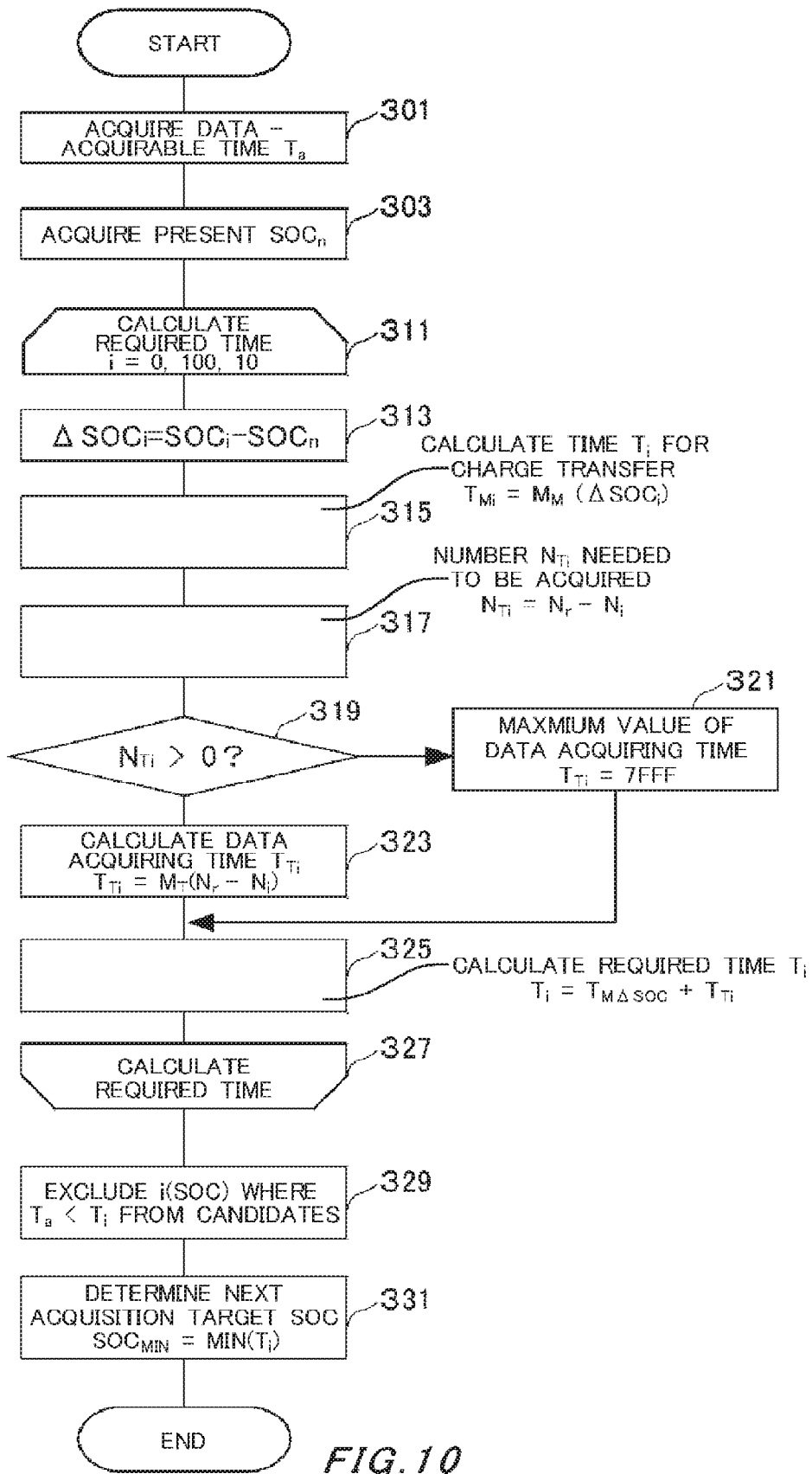
FIG. 10 shows a flow chart for a determination of an SOC which is to be the next acquisition target.

FIG. 10 is a flow chart for a determination of SOC to be the next acquisition target. The flow shown in FIG. 10 is applied to the step S108 in the flow of FIG. 9.

The control computation section 230 determines a length of time $T_a$ for a period of time when the (SOC, OCV) data is acquirable at the step S301. For example, the control computation section 230 determines as $T_a$ a length of time from a current time to a time when the transport device 10 sequentially starts. The control computation section 230 may determine as $T_a$ a length of time from a current time to a time when the motor generator MG starts to drive.

It should be noted that the control computation section 230 may specify the time when the transport device 10 sequentially starts from the history of the starting time of the transport device 10 in the past. For example, the control computation section 230 collects the history of the starting time of the transport device 10 in the past. Then, the control computation section 230 specifies the number of starting times that the transport device 10 started within the predetermined period of time at each of a plurality of periods of time in one day from the history of the starting time point. The control computation section 230 calculates, based on the specified number of starting times and the collected period of the starting time, a starting probability for each of the plurality of time points in one day, the starting probability being a probability that the transport device 10 starts within the predetermined period of time. The control computation section 230 specifies the starting time being a time when the calculated starting probability is higher than a predetermined value and prestores the same in the internal storage section. In a case of determining $T_a$, the control computation section 230 specifies the starting time corresponding to a time after the current time from the information stored in the internal storage section, and determines the time from the current time to the specified starting time as $T_a$.

At the step S303, the control computation section 230 acquires $SOC_n$ being the present SOC of the first storage battery 111. The processes from S311 to S327 are processes of performing repeating processes related to i and of calculating the required time $T_i$ required for acquiring (SOC, OCV) data for each SOC being the acquisition target. In order to describe briefly, i in this flow chart indicates the SOC being the acquisition target. For a purpose of showing understandably easily the meaning of i, i (SOC) is written in some cases. The repeating processes from S311 to S327 indicate the cases of acquiring data in the SOC determined by per 10% for SOCs within the range from 0% to 100%.

At the step S313, the control computation section 230 calculates $\Delta SOC_i$ which is a difference between i (SOC) and the present $SOC_n$. Specifically, the control computation section 230 calculates $\Delta SOC_i$ by $\Delta SOC_i = i(SOC) - SOC_n$. At the step S315, the control computation section 230 calculates a charge transfer time $T_{M\Delta SOC}$. Specifically, the control computation section 230 calculates $T_{M\Delta SOC}$ by referring to the mapping table $M_M$ and applying to $\Delta SOC_i$.

At the step S317, the control computation section 230 calculates a number $N_{Ti}$ of data needed to be acquired newly. Specifically, the control computation section 230 calculates $N_{Ti}$ by $N_{Ti} = N_r - N_i$.

At the step S319, the control computation section 230 determines whether $N_{Ti}$ is greater than 0. When $N_{Ti}$ is larger than 0, at step S323, the time $T_{Ti}$ required for acquiring the data of (i (SOC), OCV) is calculated. Specifically, $T_{Ti}$ is calculated by the formula described with reference to FIG. 8.

At the step S325, the control computation section 230 calculates the required time $T_i$. Specifically, the control computation section 230 calculates the required time $T_i$ by $T_i = T_{Mi} + T_{Ti}$. It should be noted that in the determination at the step S319, if $N_{Ti}$ is 0 or less, at the step S321, the control computation section 230 sets a maximum value Ox7FFF for $T_{Ti}$ and proceeds to the steps between the step S323 and the step S325. The maximum value Ox7FFF is a value at least greater than the maximum value of $T_{Ti}$ calculated at the step S323, and is a constant for not selecting i (SOC) as the next acquisition target.

As the repeating processes from the step S311 to the step S327 end, at the step S239, the control computation section 230 excludes, from the SOC candidates which may be the next acquisition targets, i (SOC) for which the required time $T_i$ greater than $T_a$ is calculated.

At the step S331, the control computation section 230 determines the SOC which is the next acquisition target. Specifically, the control computation section 230 determines the SOC which is the next acquisition target based on the respective required time $T_i$ for the SOCs being the candidates of acquisition targets. More specifically, the control computation section 230 searches a minimum value of the respective required time $T_i$ of the SOCs being the candidates of acquisition targets and determines the SOC having the minimal required time $T_i$ which is calculated, as the SOC to be the next acquisition target. After S331, the processing proceeds to the step S109 in the flow of FIG. 8.

Figure 11:
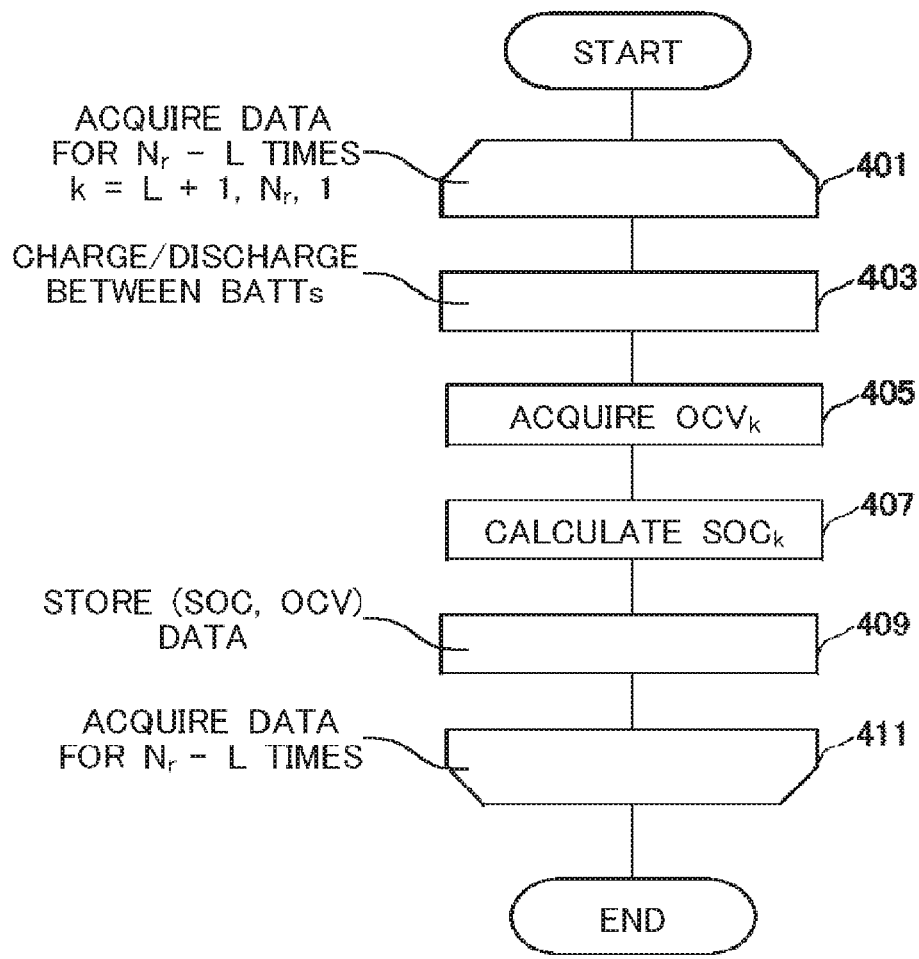
FIG. 11 shows a flow chart for acquiring (SOC, OCV) data.

FIG. 11 is a flow chart for acquiring (SOC, OCV) data in the SOC determined as the next acquisition target. The flow shown in FIG. 11 is applied to the step S109 in the flow chart of FIG. 8.

The processes from S401 to S411 are processes of performing repeating processes related to a number k of the acquired data for the $SOC_{MIN}$ determined at the step S331 in FIG. 10 and of acquiring the data of ($SOC_{MIN}$, $OCV_k$). Here, the data of ($SOC_{MIN}$, $OCV_k$) is given to be already acquired for L pieces and is stored in the internal storage section of the control computation section 230.

At a step S403, the control computation section 230 performs the charge/discharge between the storage battery sections. It should be noted that at a step S403, if k=L+1, the charge/discharge between the storage battery sections is performed such that the SOC of the first storage battery 111 becomes $SOC_{MIN}$. In cases other than the above, as described with reference to FIG. 8, after the charge/discharge between the storage battery sections is performed until the SOC of the first storage battery 111 changes by the regulated amount $\Delta SOC_T$, the control computation section 230 performs the charge/discharge between the storage battery sections such that the SOC of the first storage battery 111 becomes $SOC_{MIN}$. It should be noted that as described with reference to FIG. 8, after changing the SOC of the first storage battery 111 by the regulated amount $\Delta SOC_T$, the control computation section 230 may acquire the OCV of the first storage battery 111 and store the same in the internal storage section.

At a step S405, the first switch 114 is set to be in the open state and the OCV is acquired from the output of the first voltage sensor 112 as $OCV_k$. $OCV_k$ is handled as kth OCV data in the $SOC_{MIN}$.

At a step S407, the control computation section 230 causes the $\Delta SOC$ calculation section 231 to calculate $\Delta SOC$ which is from the SOC calculating time when the (SOC, OCV) data was acquired last time, and calculates $SOC_k$ which is the SOC of the first storage battery 111 according to the procedures described using FIG. 5.

At a step S411, the control computation section 230 stores in the internal storage section the data of ($SOC_k$, $OCV_k$) indicating a combination of $SOC_k$ and $OCV_k$ calculated at the step S406. This data of ($SOC_k$, $OCV_k$) is counted as the (SOC, OCV) data in the $SOC_{MIN}$. Also, at this time, the control computation section 230 acquires the time when the $OCV_k$ is acquired from the time measuring section 232, associates the time with the data of ($SOC_k$, $OCV_k$), and stores the time in the internal storage section.

As described with reference to the flow chart of FIG. 11 and the like, the control computation section 230 determines the SOC that $T_{Ti}$ is the minimum among the plurality of SOCs being the acquisition targets as the SOC to be the next acquisition target. According to this, $N_r$ pieces of OCVs in one SOC among the plurality of SOCs being the acquisition targets can be rapidly acquired.

For this reason, the data points necessary for specifying the SOC-OCV curves can be acquired rapidly.

Figure 12:
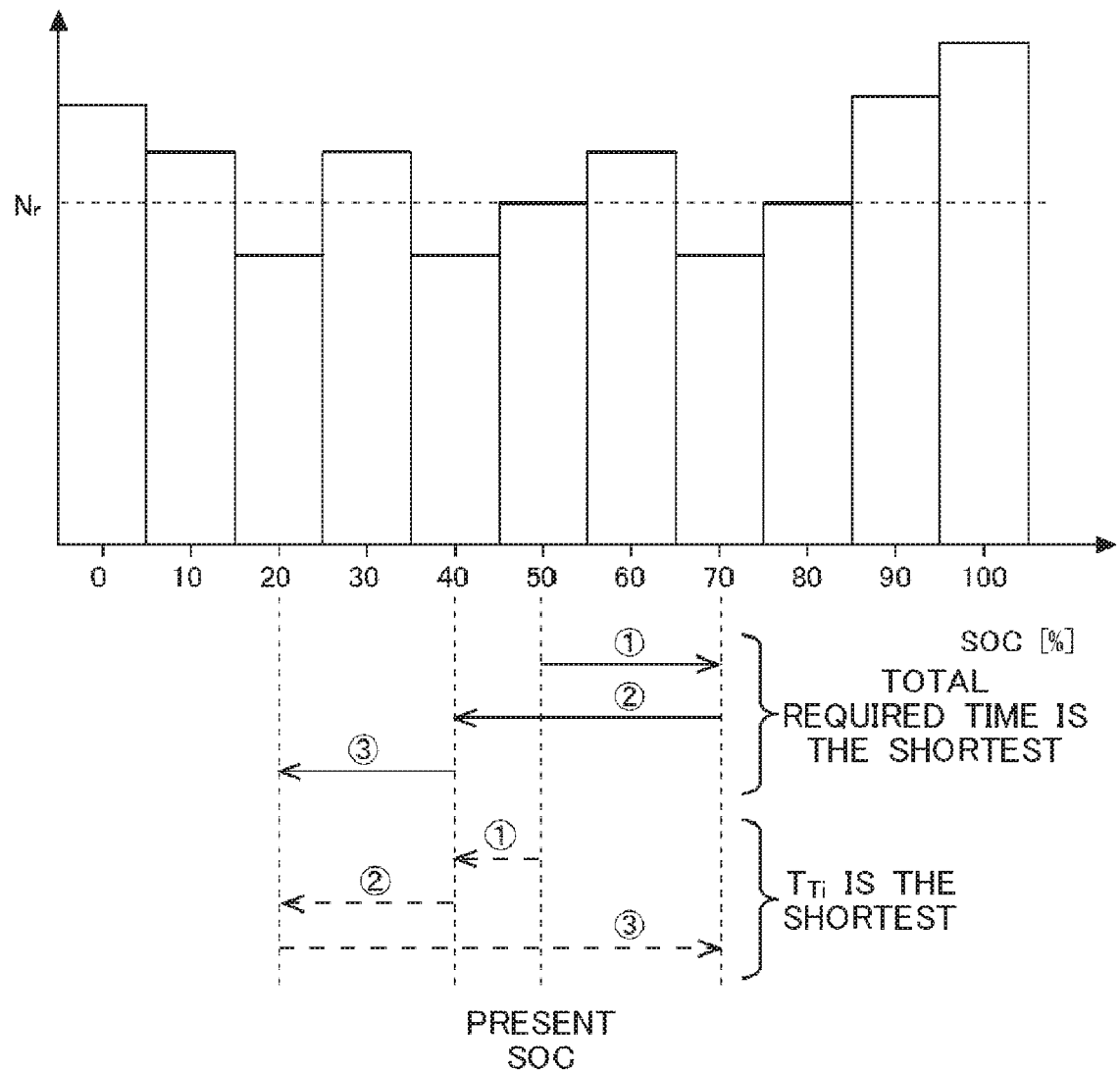
FIG. 12 shows statistic information of collected data in a histogram mode.

On the other hand, the control computation section 230 may determine the SOC being the next acquisition target such that the (SOC, OCV) data is acquired in an order in which the total required time, which is the time required for acquiring $N_r$ pieces of OCV in the all SOCs being the acquisition targets, becomes the shortest. In FIG. 12, the order in which the total required time becomes the shortest will be described briefly.

FIG. 12 shows statistic information of the collected data in a histogram mode. In FIG. 12, similar to FIG. 8, the horizontal axis indicates the SOC by percent (%) and the vertical axis indicates a number of the collected data. Here, the number of the collected data in the SOC which is 20%, the number of the collected data in the SOC which is 40%, and the number of the collected data in the SOC which is 70% are $N_r-1$. The number of the collected data in other SOCs is $N_r$ or more.

Here, in a case where the present SOC is 50%, if a collection rule for setting $T_{Ti}$ as the shortest one is used, the SOCs being the acquisition targets are selected in an order of 40%, 20%, and 70%. On the other hand, in a condition shown in FIG. 12, as illustrated, when selecting the SOCs being the acquisition targets in an order of 70%, 40%, and 20%, the total required time becomes the shortest. Here, the control computation section 230 may calculate the total required time in all selectable data collection orders with respect to the SOC in which $N_r$ pieces of data are not acquired, and determine the SOC being the next acquisition target in accordance with the data collection order in which the calculated total required time becomes the shortest.

It should be noted that in FIG. 12, in order to describe understandably easily, the case where the number of uncollected data is small is given as an example. In a case where $N_r$ is large and the number of uncollected data is great, a computation amount required for calculating the total required time in the all data collection orders increases. However, since the number of the combinations of the data collection orders to be calculated becomes less as $N_r$ is smaller, the total required time can be calculated at a practical speed in some cases. Utilizing this characteristic, if the number of the uncollected data becomes to be below the threshold, the above-described methods of calculating the total required time may be adopted.

Figure 13:
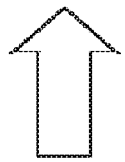
FIG. 13 shows a drawing for schematically showing a process of calculating an order in which a total required time is the shortest by using a mapping table.
Figure 13:
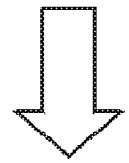

As for other implementation methods of calculating the total required time in the control computation section 230, an implementation method of determining the order in which the total required time is the shortest by using a mapping table can be considered. FIG. 13 is a drawing schematically showing a process of calculating the order in which the total required time becomes the shortest by using the mapping table.

As shown in FIG. 13, according to the mapping table 1300, a mth combination of the number of the collected data ($N_0$, $N_{10}$, . . . ) for each SOC and a first present SOC are associated with the next $SOC_{1, m}$. The $SOC_{1, m}$ is stored in the mapping table 1300 within the internal storage section of the control computation section 230 by obtaining, with a pre-calculation, the data collection order in which the total required time becomes the shortest in a situation of combinations of the corresponding collected data and the present SOC.

The control computation section 230, for example, at S108 of FIG. 9, may refer to the mapping table 1300, select a $SOC_{1, m}$ associated with the combination of the number of the collected data for each SOC being stored in the internal storage section, and the present SOC, and determine as the SOC being the next acquisition target. In this way, the control computation section 230 may determine the data collection order with less computation amounts by referring to the mapping table 1300 and determining the next SOC.

It should be noted that if $N_r$ is large, the combination of the number ($N_0$, $N_{10}$, . . . ) of the collected data becomes more and the computation amounts for the searching process in the table increases. However, since the combination of the number ($N_0$, $N_{10}$, . . . ) of the collected data becomes less as $N_r$ is smaller, the storage capacity of the mapping table 1300 is decreased, and the computation amount for the searching process also decreases. For example, in a case where $N_r=1$, at least a mapping table such as the mapping table 1300 and a searching process for the table can be implemented. If the number of the uncollected data becomes below the threshold, the mapping table such as the mapping table 1300 and the searching process for the table may be adopted.

In the above flow, although the procedure for determining the SOC-OCV curve of the first storage battery 111 has been described, procedures for selecting the second storage battery 121 and the target storage battery and determining the SOC-OCV curve of the second storage battery 121 are also similar. As the SOC-OCV curves of the respective storage batteries are determined, the determination line holding section 234 is to store two SOC-OCV curves. Also, after the SOC-OCV curve of one storage battery is determined, the SOC-OCV curve of the other storage battery may be determined; also, as the (SOC, OCV) data is acquired at the respective storage battery for each time when the charge/discharge between the storage battery sections is performed, the two SOC-OCV curves may be also determined in parallel. It should be noted that in a case of determining in turn, the SOC-OCV curve of the high-output type battery may be determined with higher priority than the high-capacity type battery. Also, an update frequency of the SOC-OCV curve of the high-output type battery may be set to be greater than the high-capacity type battery. This is because that, as described above, the variation of the influence of degradation for the high-output type battery with respect to SOC is larger than the high-capacity type battery, it is necessary to always have the SOC-OCV curve having higher accuracy for performing the charge/discharge while suppressing the degradation of the high-output type battery. In addition, it is because that according to the characteristic, the SOC of the high-capacity type battery continuously charging/discharging constant power can also be estimated by the current integration method and the like; however, the SOC of the high-output type battery immediately performing the charge/discharge by large power can be estimated with higher accuracy using the SOC-OCV curve than using the current integration method.

In the above-described embodiment, although the (SOC, OCV) data was adjusted and acquired such that the OCV is included in the reference OCV, the SOC may adjust and acquire the (SOC, OCV) data such that the SOC is included in the reference SOC. In this case, the charge amount moved by the charge/discharge between the storage battery sections may be determined based on $C_{full}$ such that the SOC falls in the range of $S_R$ from $S_{min}$ to $S_{max}$.

Also, in the above-described embodiment, the adjustment is performed such that at least one (SOC, OCV) data is included in the reference area; however, a plurality of (SOC, OCV) data which are not included in the reference area may be collected, and the SOC-OCV curve which has the highest matching degree to the data group may be selected from the reference data and be determined without performing such an adjustment. In this case, although the accuracy decreases relative to a case where the (SOC, OCV) data is included in the reference area, the SOC-OCV curve can be determined more easily.

Also, in the above-described embodiment, by causing the BATT information storing section 233 to store the reference data of the respective storage batteries and performing the matching process to each SOC-OCV curve of this reference data, the SOC-OCV curve at the present time is determined. However, it is possible to calculate an approximate curve or an approximate straight line from the plurality of (SOC, OCV) data and determine the approximate curve or the approximate straight line as the SOC-OCV curve without referring to the reference data. The approximate curve or the approximate straight line may be calculated by fitting based on the least-squares method and the like. It should be noted that it is possible to calculate an average value of the OCVs for each SOC, and calculate the approximate curve or the approximate straight line based on the calculated average value of the OCVs. Regarding the points of the coordinate (SOC, average value of OCV) on the SOC-OCV plane, an approximate straight line of each section may be calculated by connecting adjacent SOCs by straight lines. If the points of the coordinate (SOC, average value of OCV) are three or more, a polygonal line as an aggregation of the approximate straight lines is calculated. The SOC-OCV curve for each capacity retention rate in the reference data has high reliability since it is the representative data of the type of the storage battery, which is prepared by the battery maker, for example. However, since a variation of individual product is not supported, the variation becomes an error. However, if the approximate curve or the approximate straight line is calculated from the actually-measured (SOC, OCV) data, the curve can be said as a real SOC-OCV curve which absorbs the individual variation. Therefore, there is a possibility that the curve can be utilized as the SOC-OCV curve with higher accuracy. Also, depending on the types of the storage batteries, the reference area may not exist in some cases. In such a case, the SOC-OCV curve can be determined by using the approximate curve or the approximate straight line calculated from the actually-measured (SOC, OCV) data and the reference data at the same time. Specifically, one in a shape closest to that of the approximate curve or the approximate straight line calculated from the actually-measured (SOC, OCV) data among the SOC-OCV curves for each capacity retention rate included in the reference data may be determined as the SOC-OCV curve.

When selecting and determining the SOC-OCV curve from the reference data, since the capacity retention rate is associated, the degradation progress degree of the storage battery at that time point may be grasped at the same time. On the other hand, when calculating the approximate curve or the approximate straight line from the actually-measured (SOC, OCV) data, although an increased accuracy is expected, the degradation progress degree cannot be grasped. Therefore, it may be preferable that the methods of determining the SOC-OCV curve are selectable by taking situations requested by the system into account. Also, for example, in order to perform an error check of the acquired (SOC, OCV) data, both of them may be used at the same time.

Also, in the above-described embodiment, as described with reference to FIG. 9 particularly, the procedure has been described, in which if the predetermined coordinate number cannot be acquired within the determined time, all of the (SOC, OCV) data is discarded and the processing is performed again from the beginning. However, the plurality of (SOC, OCV) data individually excluded from the old (SOC, OCV) data and utilized for the matching process may be limited to the data acquired within the constant period of time. Also, the reference for selecting (SOC, OCV) data utilized for the matching process is not limited to the time when the (SOC, OCV) data is acquired. For example, in the charge/discharge between the storage battery sections, if an integrated amount of the electricity amount of the moved electric charges exceeds a predetermined electricity amount, the data may be excluded in turn from the old (SOC, OCV) data. In this case, the next integrated amount is updated to an integrated amount at a time from the time point when the second old (SOC, OCV) data is acquired. It should be noted that the electricity amount being the reference may be changed in accordance with the driving range, the environmental temperature, accuracy requested by the SOC-OCV curve and the like.

It should be noted that the transport device is not limited to an electric vehicle. The transport device may be a vehicle, such as a hybrid car comprising a power supply apparatus and an internal combustion engine, a train and the like. The transport device is not limited to a vehicle and includes various devices for transporting objects moving by land, air or water, or under water, such as airplanes or ships comprising a power supply apparatus. The transport device is a concept including various devices for transport comprising a power supply apparatus.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 . . . transport device, 100 . . . power storage device, 101 . . . first electric storage module, 102 . . . second electric storage module, 103 . . . charge/discharge circuit module, 111 . . . first storage battery, 112 . . . first voltage sensor 113 . . . first current sensor, 114 . . . first switch, 121 . . . second storage battery, 122 . . . second voltage sensor, 123 . . . second current sensor, 124 . . . second switch, 130 . . . battery ECU, 131 . . . first VCU, 132 . . . second VCU, 133 . . . third switch, 142 . . . third voltage sensor, 141 . . . PDU, 151 . . . charging converter, 152 . . . power reception section, 153 . . . external power supply, 230 . . . control computation section, 231 . . . ΔSOC calculation section, 232 . . . time measuring section, 233 . . . BATT information storing section, 234 . . . determination line holding section, 235 . . . SOC response section, 290 . . . recording medium, 700 . . . mapping line, 1300 . . . mapping table

What is claimed is:

1. A power supply apparatus, comprising:
a first electric storage section;
a second electric storage section;
a charge/discharge circuit which performs charge/discharge between the first electric storage section and the second electric storage section; and
a computer which controls the charge/discharge circuit,
wherein the computer sets at least one of the first electric storage section and the second electric storage section as a target electric storage section,
acquires
a target SOC, which is a charge rate of the target electric storage section, and
a target OCV, which is an open-end voltage of the target electric storage section,
collects, by using a charge transfer between the first electric storage section and the second electric storage section,
collected data including the target SOC and the target OCV in an order based on a collection rule determined by the collected data as it is collected during the charge transfer,
an operation time including an acquisition time which is a time required for acquiring the target SOC and the target OCV, and the target SOC,
the collected data being an aggregation of the data which is collected, and
estimates correlation information between an SOC and an OCV of the target electric storage section based on a plurality of the data.

2. The power supply apparatus according to claim 1,
wherein the computer derives uncollected data which is an aggregation of the data that is uncollected based on the collected data, and
collects the data in an order based on the collection rule determined based on an operation time including a time required for the charge transfer,
the operation time calculated from a difference between an SOC included in the uncollected data and the target SOC.

3. The power supply apparatus according to claim 2,
wherein the computer controls the charge/discharge circuit to collect the data by giving a higher priority to an SOC included in the uncollected data from which a shorter operation time is calculated.

4. The power supply apparatus according to claim 1,
wherein the acquisition time includes a time required until a temporal change of voltage of the target electric storage section becomes stable after the charge transfer.

5. The power supply apparatus according to claim 1,
wherein the acquisition time is based on a difference between a number of the data which is to be collected for each SOC and a number of the data which is included in the collected data and is already collected with respect to the target SOC.

6. The power supply apparatus according to claim 5, wherein
the number of the data which is to be collected for each SOC is two or more.

7. The power supply apparatus according to claim 2,
wherein the computer derives uncollected data which is an aggregation of the data that is uncollected based on the collected data, and
selects with higher priority the order in which a total value of the operation time for collecting each data of the uncollected data becomes smaller.

8. The power supply apparatus according to claim 1,
wherein the computer acquires the target SOC based on a charge transfer amount to the target electric storage section since a time when an SOC of the target electric storage section is included in a range of a reference SOC which is an SOC or since a time when an OCV of the target electric storage section is included in a range of a reference OCV which is an OCV corresponding to the reference SOC,
wherein in the reference SOC, a difference of OCVs, with respective to the same SOC in a plurality of degradation states of the target electric storage section, is not more than a threshold.

9. The power supply apparatus according to claim 1,
wherein the computer collects the data such that a reference SOC which is an SOC in which a difference of OCVs, with respect to the same SOC in a plurality of degradation states of the target electric storage section, is not more than a threshold, and
a reference OCV which is an OCV corresponding to the reference SOC are included as the target SOC and the target OCV respectively.

10. The power supply apparatus according to claim 8, wherein if an SOC of the target electric storage section before performing the charge transfer is not included in the range of the reference SOC, or if an OCV of the target electric storage section before performing the charge transfer is not included in the range of the reference OCV, the computer performs, prior to the charge transfer, charge/discharge between the first electric storage section and the second electric storage section such that the SOC of the target electric storage section is included in the range of the reference SOC or the OCV of the target electric storage section is included in the range of the reference OCV.

11. The power supply apparatus according to claim 1, wherein the computer includes a storage section which prestores correlation information between SOCs and OCVs in a plurality of degradation states of at least one of the first electric storage section and the second electric storage section, and the computer selects with higher priority as the estimated correlation information, correlation information having a higher adaptability for the plurality of the data including the target SOC and the target OCV among the correlation information, stored by the storage section, between the SOCs and the OCVs in the plurality of degradation states of the target electric storage section.

12. The power supply apparatus according to claim 1, wherein the computer estimates the correlation information based on an approximate curve or an approximate straight line with respect to the plurality of the data including the target SOC and the target OCV.

13. The power supply apparatus according to claim 1, wherein at least one of the first electric storage section and the second electric storage section supplies power to a driving section, the charge/discharge circuit performs charge/discharge among the first electric storage section, the second electric storage section, and the driving section, and the computer controls, while performing the charge transfer, the charge/discharge circuit so as not to perform a charge/discharge between the first electric storage section and the driving section, and between the second electric storage section and the driving section.

14. The power supply apparatus according to claim 1, wherein when an inquiry about an SOC of the first electric storage section is received, the computer calculates an SOC of the first electric storage section based on an OCV of the first electric storage section and the estimated correlation information to respond.

15. The power supply apparatus according to claim 1, wherein the first electric storage section has a poor energy density and an excellent output density, compared with the second electric storage section.

16. The power supply apparatus according to claim 15, wherein when the first electric storage section and the second electric storage section are selected as the target electric storage section, the computer estimates with priority the correlation information of the first electric storage section.

17. A transport device comprising the power supply apparatus according to claim 1.

18. An estimating method of estimating correlation information between an SOC and an OCV which are respectively a charge rate and an open-end voltage of a power supply apparatus, the power supply apparatus including:

a first electric storage section;
a second electric storage section; and
a charge/discharge circuit which performs charge/discharge between the first electric storage section and the second electric storage section, wherein the estimating method comprises:
setting at least one of the first electric storage section and the second electric storage section as a target electric storage section,
acquiring
a target SOC, which is an SOC of the target electric storage section, and
a target OCV, which is an OCV of the target electric storage section,
collecting, by using a charge transfer between the first electric storage section and the second electric storage section,
collected data including the target SOC and the target OCV in an order based on a collection rule determined by the collected data as it is collected during the charge transfer,
an operation time including an acquisition time which is a time required for acquiring the target SOC and the target OCV, and the target SOC,
the collected data being an aggregation of the data which is collected, and
estimating correlation information between an SOC and an OCV of the target electric storage section based on a plurality of the data.

19. A non-transitory computer readable medium storing a program for estimating correlation information between an SOC and an OCV which are respectively a charge rate and an open-end voltage of a power supply apparatus, the power supply apparatus including:

a first electric storage section;
a second electric storage section; and
a charge/discharge circuit which performs charge/discharge between the first electric storage section and the second electric storage section, wherein the program causes a computer to execute:
setting at least one of the first electric storage section and the second electric storage section as a target electric storage section,
acquiring a target SOC and a target OCV which are respectively an SOC and an OCV of the target electric storage section,
collecting, by using a charge transfer between the first electric storage section and the second electric storage section,
collected data including the target SOC and the target OCV in an order based on a collection rule determined by the collected data as it is collected the during the charge transfer,
an operation time including an acquisition time which is a time required for acquiring the target SOC and the target OCV, and
the target SOC,
the collected data being an aggregation of the data which is collected, and estimating correlation information between an SOC and an OCV of the target electric storage section based on a plurality of the data.

* * * * *